(12) United States Patent
Liu

(10) Patent No.: US 11,755,068 B2
(45) Date of Patent: Sep. 12, 2023

(54) SLIDING MECHANISM AND ELECTRONIC DEVICE

(71) Applicant: BEIJING XIAOMI MOBILE SOFTWARE CO., LTD., Beijing (CN)

(72) Inventor: Zhenhua Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 141 days.

(21) Appl. No.: 17/328,231

(22) Filed: May 24, 2021

(65) Prior Publication Data

US 2022/0129034 A1 Apr. 28, 2022

(30) Foreign Application Priority Data

Oct. 27, 2020 (CN) .......................... 202011165812.3

(51) Int. Cl.
*G06F 1/16* (2006.01)
(52) U.S. Cl.
CPC .......... *G06F 1/1624* (2013.01); *G06F 1/1652* (2013.01); *G06F 1/1656* (2013.01)
(58) Field of Classification Search
CPC ..... G06F 1/1624; G06F 1/1652; G06F 1/1656
See application file for complete search history.

(56) References Cited

U.S. PATENT DOCUMENTS

| 11,315,443 | B2 * | 4/2022 | Han | G06F 1/1652 |
|---|---|---|---|---|
| 2012/0162876 | A1 | 6/2012 | Kim | |
| 2018/0014417 | A1 | 1/2018 | Seo et al. | |
| 2018/0081473 | A1 | 3/2018 | Seo et al. | |
| 2020/0152095 | A1 * | 5/2020 | Lee | G09F 9/301 |
| 2020/0201394 | A1 * | 6/2020 | Choi | G06F 1/1652 |
| 2020/0267246 | A1 * | 8/2020 | Song | H05K 1/148 |
| 2020/0304613 | A1 * | 9/2020 | Cha | G06F 1/1652 |
| 2022/0066510 | A1 * | 3/2022 | Cha | G06F 1/1677 |

OTHER PUBLICATIONS

European Patent Application No. 21176780.1 extended Search and Opinion dated Dec. 8, 2021, 10 pages.

* cited by examiner

*Primary Examiner* — Rockshana D Chowdhury
(74) *Attorney, Agent, or Firm* — COZEN O'CONNOR

(57) ABSTRACT

A sliding mechanism for an electronic device is provided. The sliding mechanism includes a slide rail assembly and a driving assembly. The slide rail assembly includes a fixed member and a slide rail, the fixed member is fixed to a housing assembly of the electronic device, the fixed member is provided with a sliding slot, and an end of the slide rail is slidably limited in the sliding slot. The driving assembly is fixed to the housing assembly, the driving assembly includes a driving unit connected to the slide rail in a one-to-one correspondence, and the driving unit is configured to drive the slide rail to slide from the housing assembly to the outside and to slide from the outside to the housing assembly.

19 Claims, 21 Drawing Sheets

SLIDING MECHANISM AND ELECTRONIC DEVICE

CROSS-REFERENCE TO RELATED APPLICATION

This application claims priority to and benefits of Chinese Patent Application Serial No. 202011165812.3, filed on Oct. 27, 2020, the entire content of which is incorporated herein by reference.

FIELD

The present disclosure relates to a technical field of electronic devices, and more particularly to a sliding mechanism and an electronic device.

BACKGROUND

With the development of a flexible screen technology, a screen of an electronic device is designed in an increasing variety of forms, such as a foldable screen, a ring screen, and a curved screen. As the electronic becomes smaller and batteries become larger with more capacity, the electronic devices have been designed in more flexible forms. A flexible screen that can stretch and retract, may not only meet users' demands for the size of the screen, but also facilitate the miniaturization of the electronic device, thus improving the user experience. However, controlling a flexible screen to stretch and may be difficult to design.

SUMMARY

Embodiments of an aspect of the present disclosure provide a sliding mechanism for an electronic device. The sliding mechanism includes: a slide rail assembly including a fixed member and a slide rail, the fixed member being fixed to a housing assembly of the electronic device, the fixed member being provided with a sliding slot, and an end of the slide rail being slidably limited in the sliding slot; and a driving assembly fixed to the housing assembly, the driving assembly including a driving unit connected to the slide rail in a one-to-one correspondence, and the driving unit being configured to drive the slide rail to slide from the housing assembly to the outside and to slide from the outside to the housing assembly.

Embodiments of another aspect of the present disclosure provide an electronic device. The electronic device includes a housing assembly, a sliding mechanism, and a flexible screen. The sliding mechanism includes: a slide rail assembly having a front surface and a rear surface, and including a fixed member and a slide rail, the fixed member being fixed to a housing assembly of the electronic device, the fixed member being provided with a sliding slot, and an end of the slide rail being slidably limited in the sliding slot; and a driving assembly fixed to the housing assembly, the driving assembly including a driving unit connected to the slide rail in a one-to-one correspondence, and the driving unit being configured to drive the slide rail to slide from the housing assembly to the outside and to slide from the outside to the housing assembly. A part of the flexible screen is arranged on the front surface of the slide rail and fixed to the housing assembly, an end of the flexible screen is arranged to an edge or the rear surface of the slide rail, the slide rail is configured to slide from the housing assembly to the outside to allow the flexible screen to stretch, and the slide rail is further configured to slide from the outside to the housing assembly to allow the flexible screen to retract.

DETAILED DESCRIPTION

Figure 1:
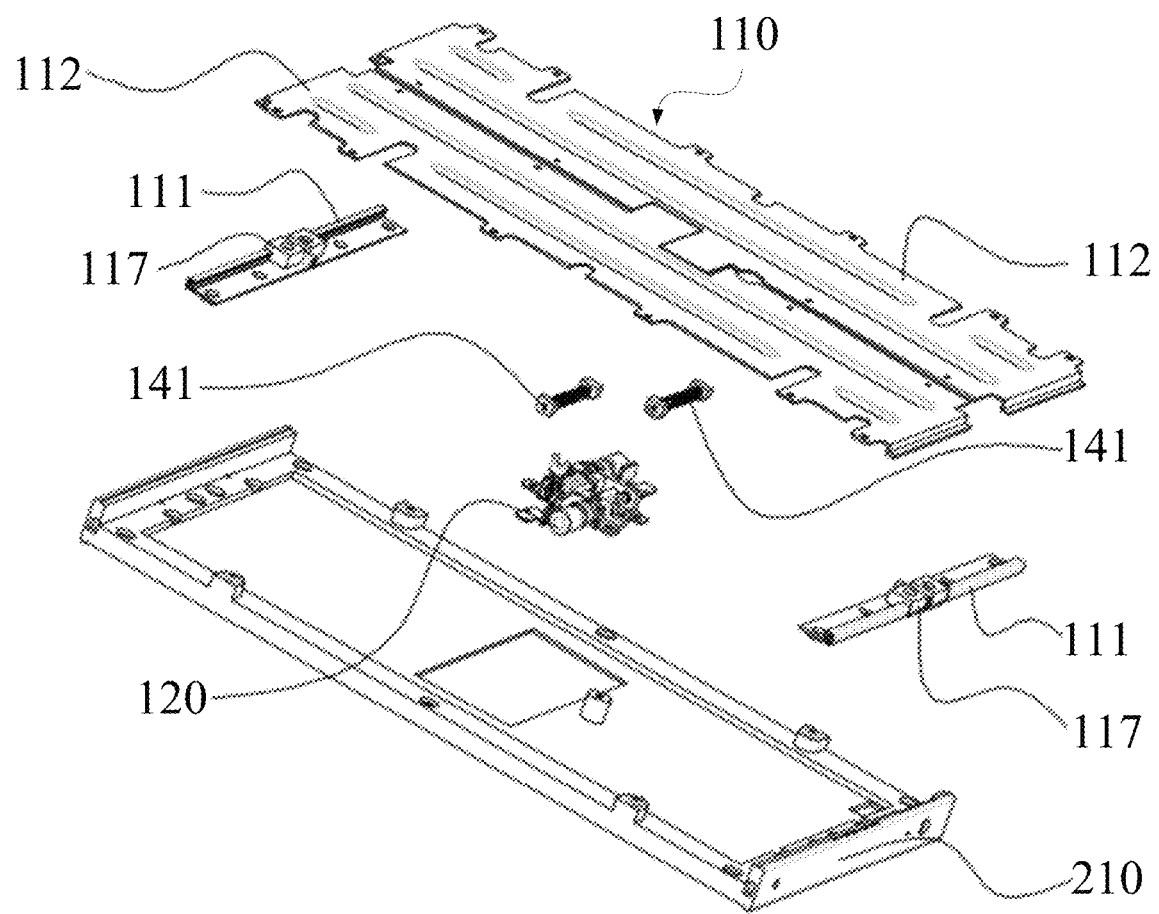
FIG. 1 is a partial exploded view of an electronic device according to an illustrative embodiment of the present disclosure.

Illustrative embodiments will be described in detail here, and examples thereof are illustrated in the drawings. In the following description involving the drawings, the same numerals in the different drawings denote the same or similar elements, unless otherwise indicated. The embodiments described in the following illustrative embodiments are not representative of all embodiments consistent with the present disclosure. Rather, they are merely examples of apparatuses and methods consistent with some aspects of the present disclosure as detailed in the claims.

The terms used in the description of the present disclosure are for the purpose of describing particular embodiments only and are not intended to limit the present disclosure. Unless otherwise defined, the technical and scientific terms used in the present disclosure have the same meanings as commonly understood by those of ordinary skill in the art to which the present disclosure belongs. The terms, such as "first," "second," or the like, which are used in the specification and the claims of the present closure, are not intended to indicate any sequence, number or importance, but for distinguishing different components. Also, the terms, such as "one", "a/an," or the like, are not intended to limit the number, but for indicating the existence of at least one. Unless otherwise indicated, the terms, such as "comprise," "include," or the like, are intended to specify that the elements or the objects stated before these terms encompass the elements or the objects and equivalents thereof listed after these terms, but not preclude other elements or objects. The terms, such as "connect," "couple" or the like, are not intended to define a physical connection or mechanical connection, but may include an electrical connection/coupling, directly or indirectly.

The singular forms "a/an," "said," and "the" used in the specification and appended claims of the present disclosure are intended to include the plural forms as well, unless the context clearly indicates otherwise. It will also be understood that the term "and/or" as used herein refers to and encompasses any and all possible combinations of one or more of the associated listed items.

With the development of flexible screens, the flexible screens are designed in diversified forms. As an example, a flexible screen may have a stretched state and a retracted state, which provides an electronic device with different sizes of display areas and improves a user experience. The flexible screen can stretch and retract through a sliding mechanism provided in the embodiments of the present disclosure, which is illustrated below with reference to the drawings.

FIG. 1 is a partial exploded view of an electronic device according to an illustrative embodiment of the present disclosure. The sliding mechanism provided in the embodiment of the present disclosure is applied to an electronic device. Referring to FIG. 1, the sliding mechanism 100 includes a slide rail assembly 110 and a driving assembly 120.

Figure 2:
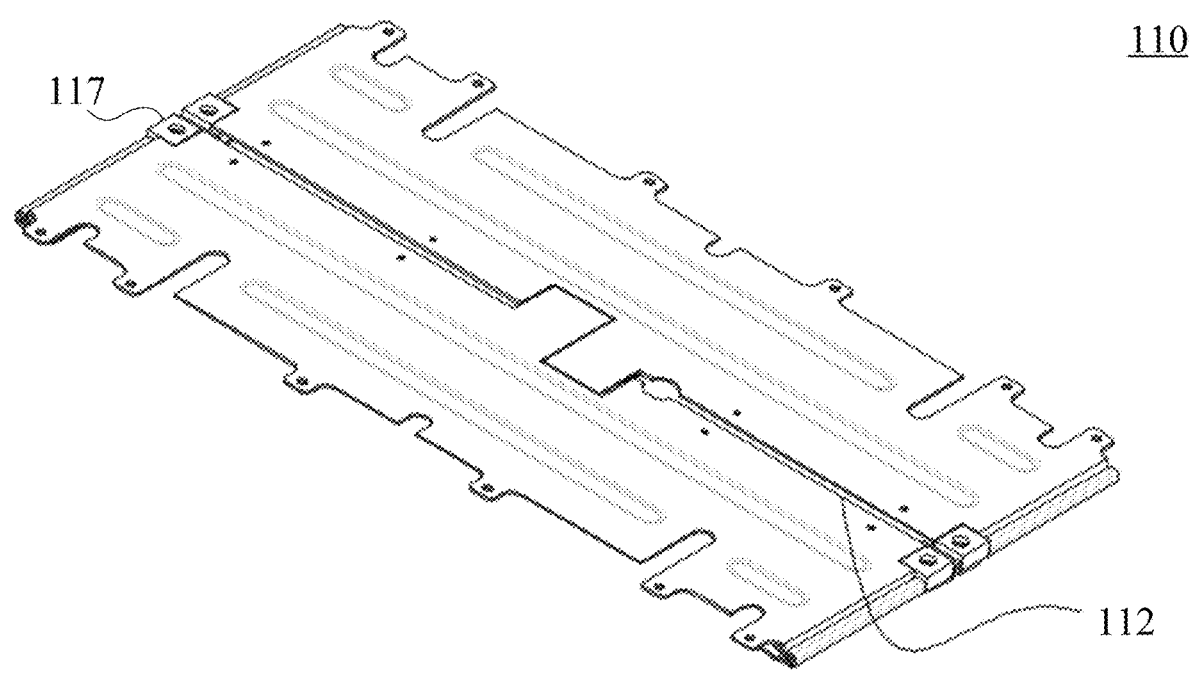
FIG. 2 is a schematic view of a slide rail retracted according to an illustrative embodiment of the present disclosure.
Figure 3:
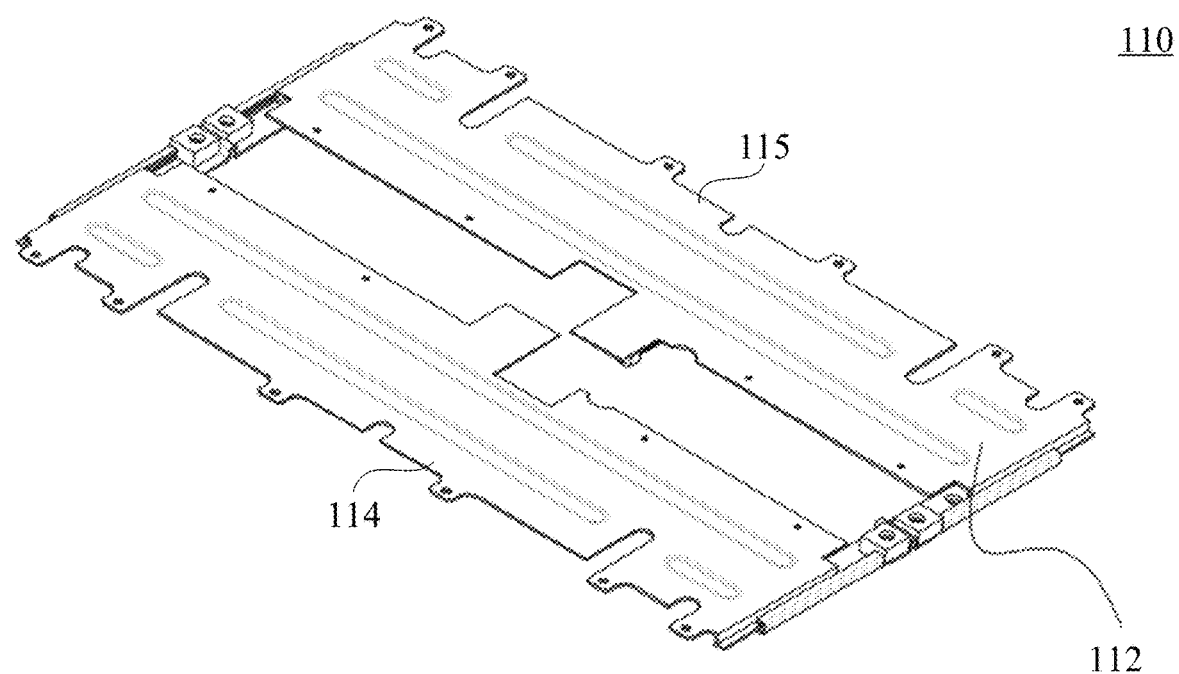
FIG. 3 is a schematic view of a slide rail stretched according to an illustrative embodiment of the present disclosure.
Figure 4:
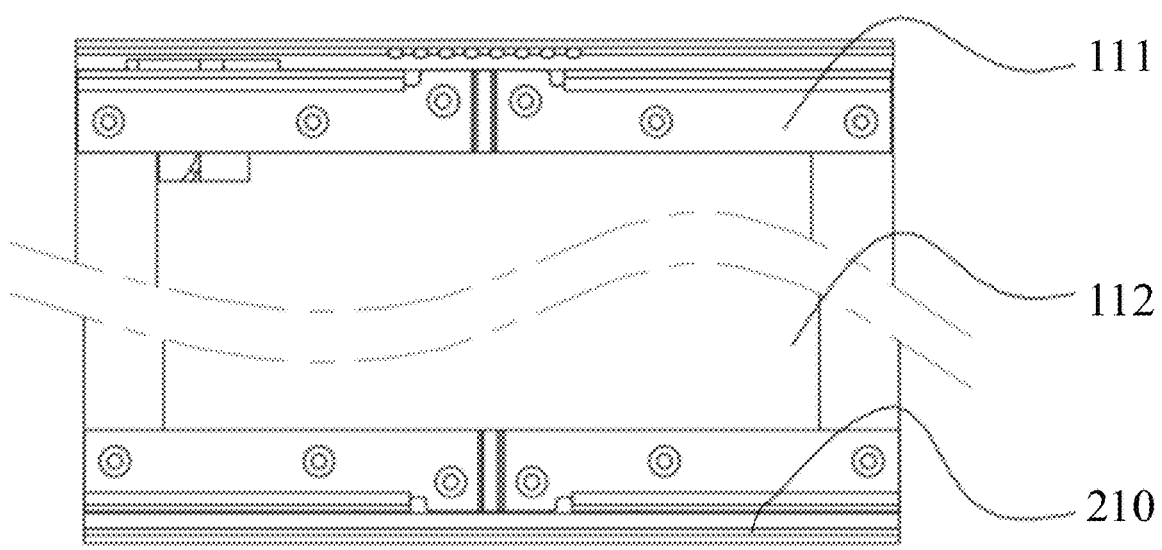
FIG. 4 is a schematic view of fit between a slide rail assembly and a housing assembly according to an illustrative embodiment of the present disclosure.
Figure 5:
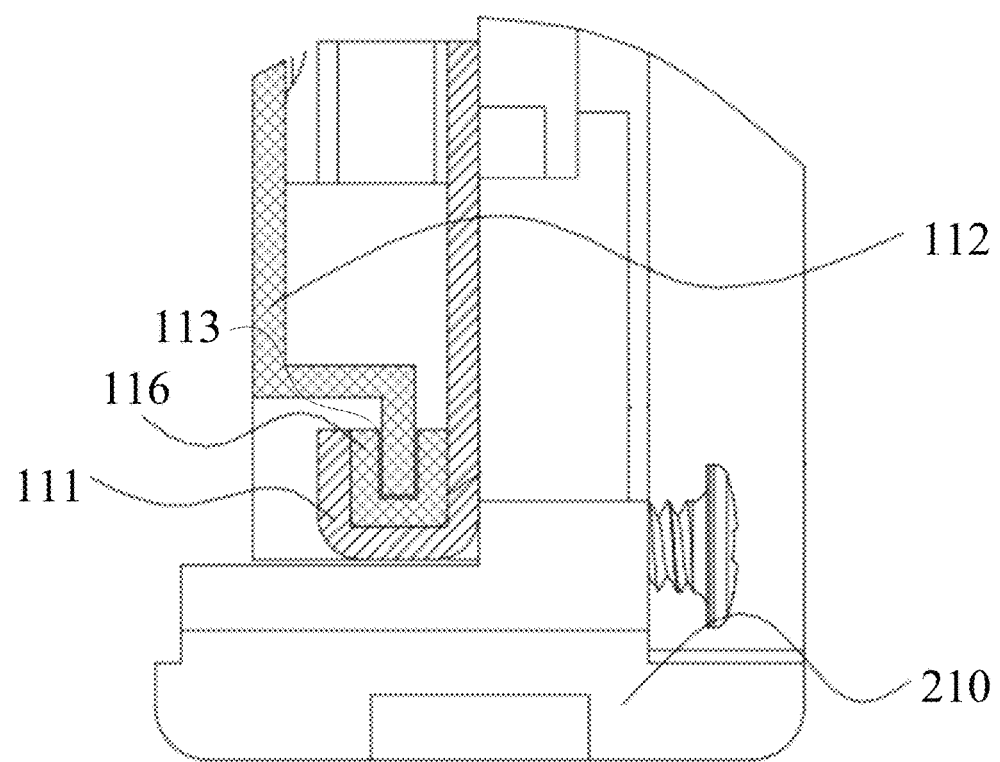
FIG. 5 is a partial sectional view of fit between a slide rail assembly and a housing assembly according to an illustrative embodiment of the present disclosure.

FIG. 2 is a schematic view of a slide rail 112 retracted according to an illustrative embodiment of the present disclosure, FIG. 3 is a schematic view of a slide rail 112 stretched according to an illustrative embodiment of the present disclosure, FIG. 4 is a schematic view of fit between a slide rail assembly 110 and a housing assembly 210 according to an illustrative embodiment of the present disclosure, and FIG. 5 is a partial sectional view of fit between a slide rail assembly 110 and a housing assembly 210 according to an illustrative embodiment of the present disclosure. Referring to FIG. 2 to FIG. 5, the slide rail assembly 110 includes at least one fixed member 111 and at least one slide rail 112. The fixed member 111 is fixed to the housing assembly 210 of the electronic device. The fixed member 111 is provided with a first sliding slot 113. An end of the slide rail 112 is slidably limited in the first sliding slot 113. As an example, referring to FIG. 2 and FIG. 3, the slide rail assembly 110 includes a first slide rail 114 and a second slide rail 115 configured to slide towards each other and slide away from each other. When the first slide rail 114 and the second slide rail 115 slide, facing away from each other, from the housing assembly 210 to the outside, that is, the first slide rail 114 and the second slide rail 115 stretch, the flexible screen 220 is enabled to stretch. When the first slide rail 114 and the second slide rail 115 slide, facing each other, from the outside to the housing assembly 210, that is, the first slide rail 114 and the second slide rail 115 retract, the flexible scree 220 is enabled to retract. Two fixed members 111 may be provided. The two fixed members 111 are arranged oppositely. The first slide rail 114 and the second slide rail 115 are limited between two first sliding slots 113 of the two fixed members 111. As an example, the fixed member 111 may be fixed to the housing assembly 210 through a screw.

In some embodiments, still referring to FIG. 5, the first sliding slot 113 includes a lubricating layer 116, and the lubricating layer 116 forms an inner wall of the first sliding slot 113. This facilitates the slide rail 112 to smoothly slide in the first sliding slot 113 of the fixed member 111. As an example, the fixed member 111 may define the slot by stamping molding of stainless steel. Materials of the lubricating layer 116 include daicel (also referred to as polyformaldehyde or POM). The lubricating layer 116 is formed by injecting daicel into the slot to give a lubrication effect to the inner wall of the first sliding slot 113.

Figure 6:
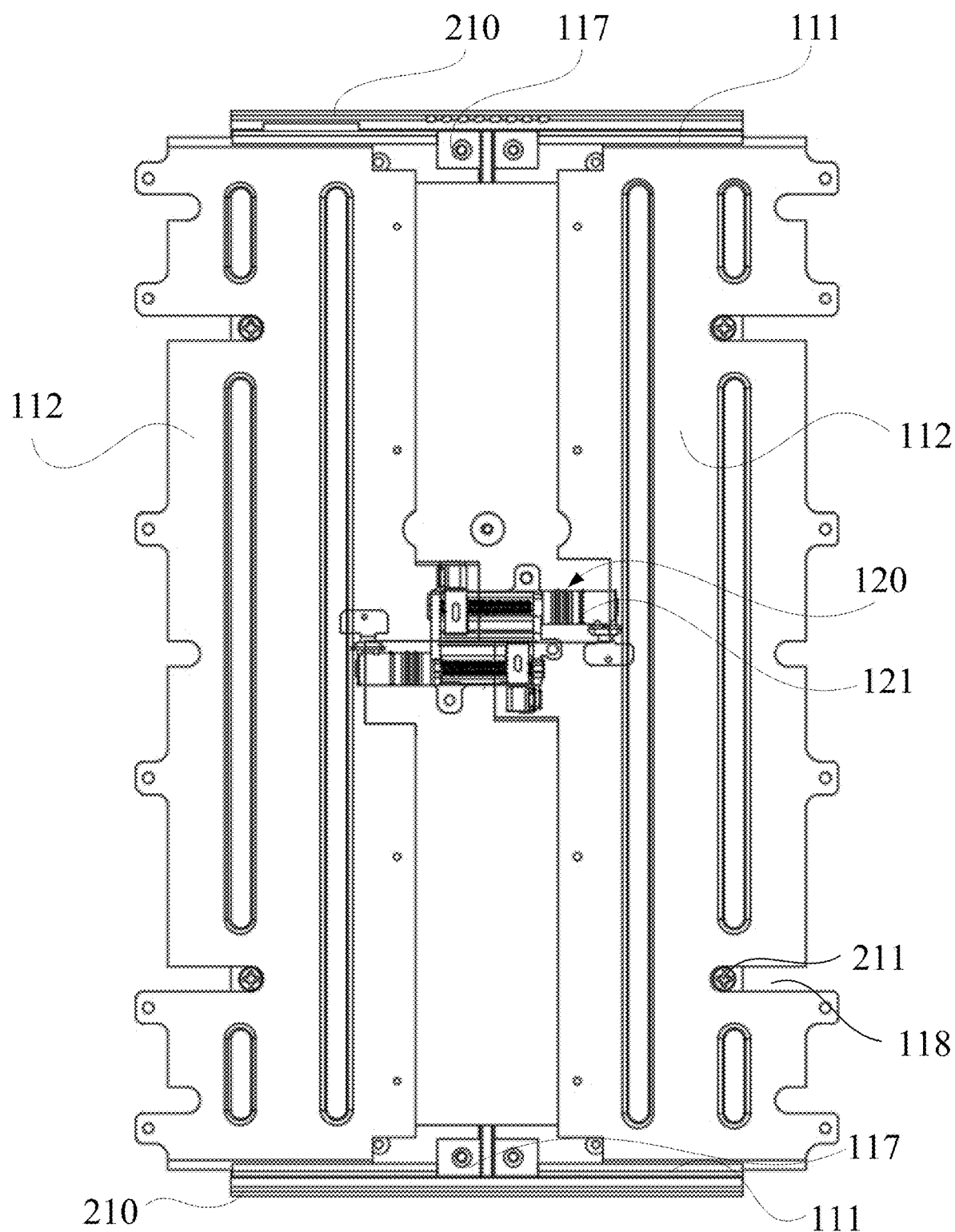
FIG. 6 is a schematic view of fit among a slide rail assembly, a driving assembly, and a housing assembly according to an illustrative embodiment of the present disclosure.

FIG. 6 is a schematic view of fit among a slide rail assembly 110, a driving assembly 120, and a housing assembly 210 according to an illustrative embodiment of the present disclosure. Referring to FIG. 1 and FIG. 6, the driving assembly 120 is fixed to the housing assembly 210. The driving assembly 120 includes driving units 121 having the same number as the slide rails 112. The driving units 121 are connected to the slide rails 112 in a one-to-one correspondence, and the driving units 121 are configured to drive the slide rails 112 to slide from the housing assembly 210 to the outside and slide from the outside to the housing assembly 210. That is, each driving unit 121 drives one slide rail 112 to slide. As an example, the slide rail 112 includes a first slide rail 114 and a second slide rail 115 configured to slide towards each other and slide away from each other, the driving unit 121 includes a first driving unit and a second driving unit, the first driving unit is connected to the first slide rail 114, and the second driving unit is connected to the second slide rail 115. The driving unit 121 may automatically control the sliding of the slide rail 112, and may also make the slide rail 112 slide stably to any position in its maximum stroke, so that the flexible screen 220 can stretch to a variety of sizes, thus improving the usage experience of a user.

According to the sliding mechanism 100 provided in embodiments of the present disclosure, the end of the slide rail 112 is slidably limited in the sliding slot 113, the driving unit 121 of the driving assembly 120 is connected to the slide rail 112, and the driving unit 121 drives the slide rail 112 to slide from the housing assembly 210 to the outside, so that the flexible screen 220 of the electronic device can stretch, thus increasing a display area of the flexible screen 220. The driving unit 121 drives the slide rail 112 to slide from the outside to the housing assembly 210, so that the flexible screen 220 of the electronic device can retract, thus reducing the display area of the flexible screen 220. With the driving unit 121, the slide rail 112 can be driven to slide to any position in its maximum stroke, so that the flexible screen 220 can display in different sizes, which is conducive to improving the user experience.

In some embodiments, referring to FIG. 2 and FIG. 3, the slide rail assembly 110 further includes a buffering limiting member 117. The buffering limiting member 117 is arranged on the fixed member 111, and the buffering limiting member 117 is configured to abut against the slide rail 112 sliding from the outside to the housing assembly 210. In this way, the maximum stroke of the sliding of the slide rail 112 to the housing assembly 210 is limited. The buffering limiting member 117 may include plastic parts, which not only play a role in limiting the slide rail 112, but also make the slide rail 112 stably abut against the buffering limiting member 117, without wearing the slide rail 112. As an example, the fixed member 111 may be provided with two buffering limiting members 117. The two buffering limiting members 117 are arranged in the middle of the fixed member 111, and configured to abut against the first slide rail 114 and the second slide rail 115, respectively.

Figure 7:
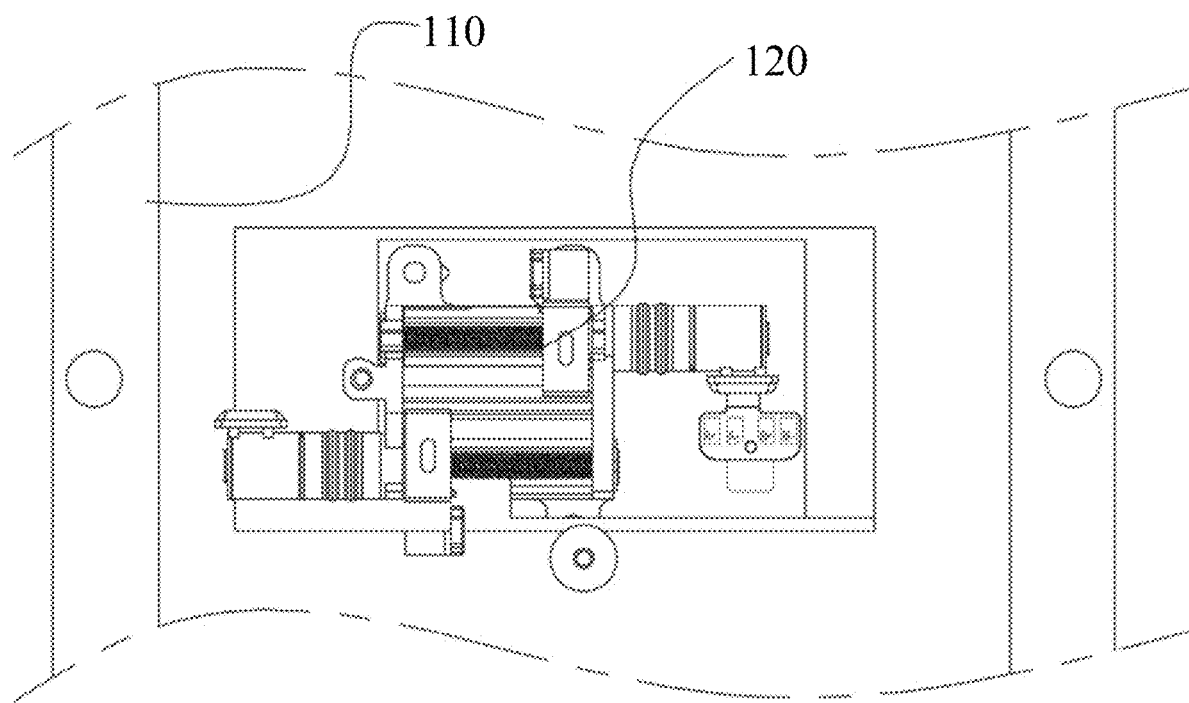
FIG. 7 is a schematic view of fit between a driving assembly and a slide rail assembly according to an illustrative embodiment of the present disclosure.
Figure 8:
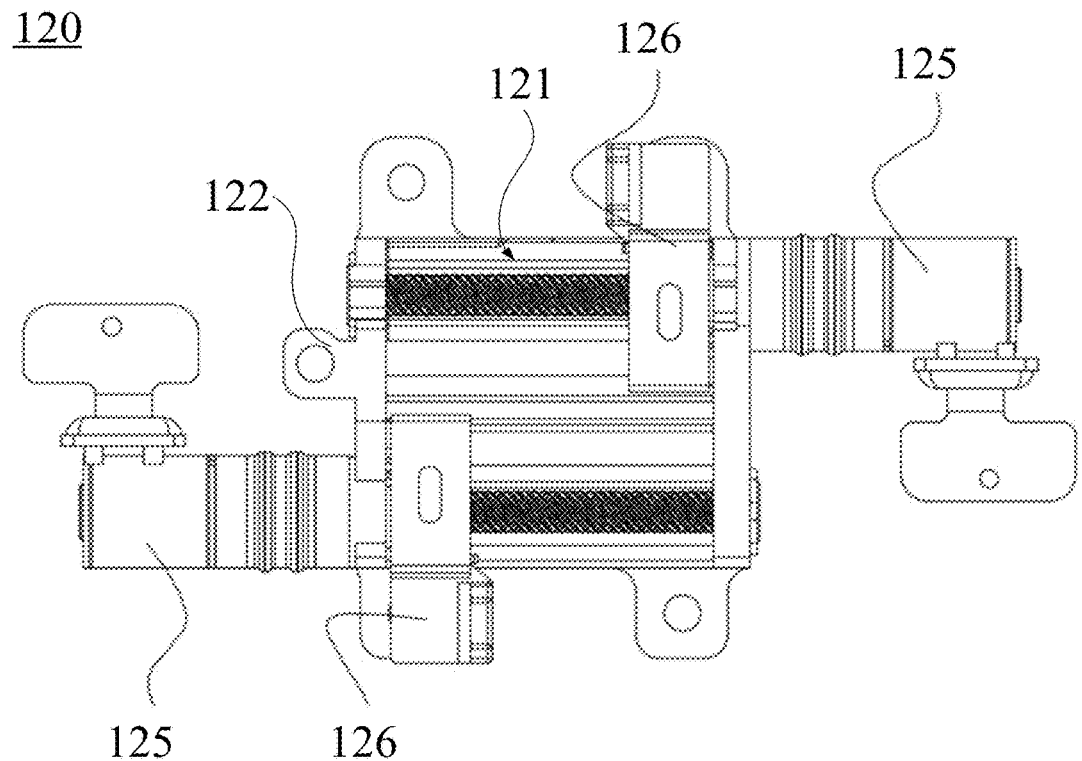
FIG. 8 is a partial schematic view of a driving assembly according to an illustrative embodiment of the present disclosure.
Figure 9:
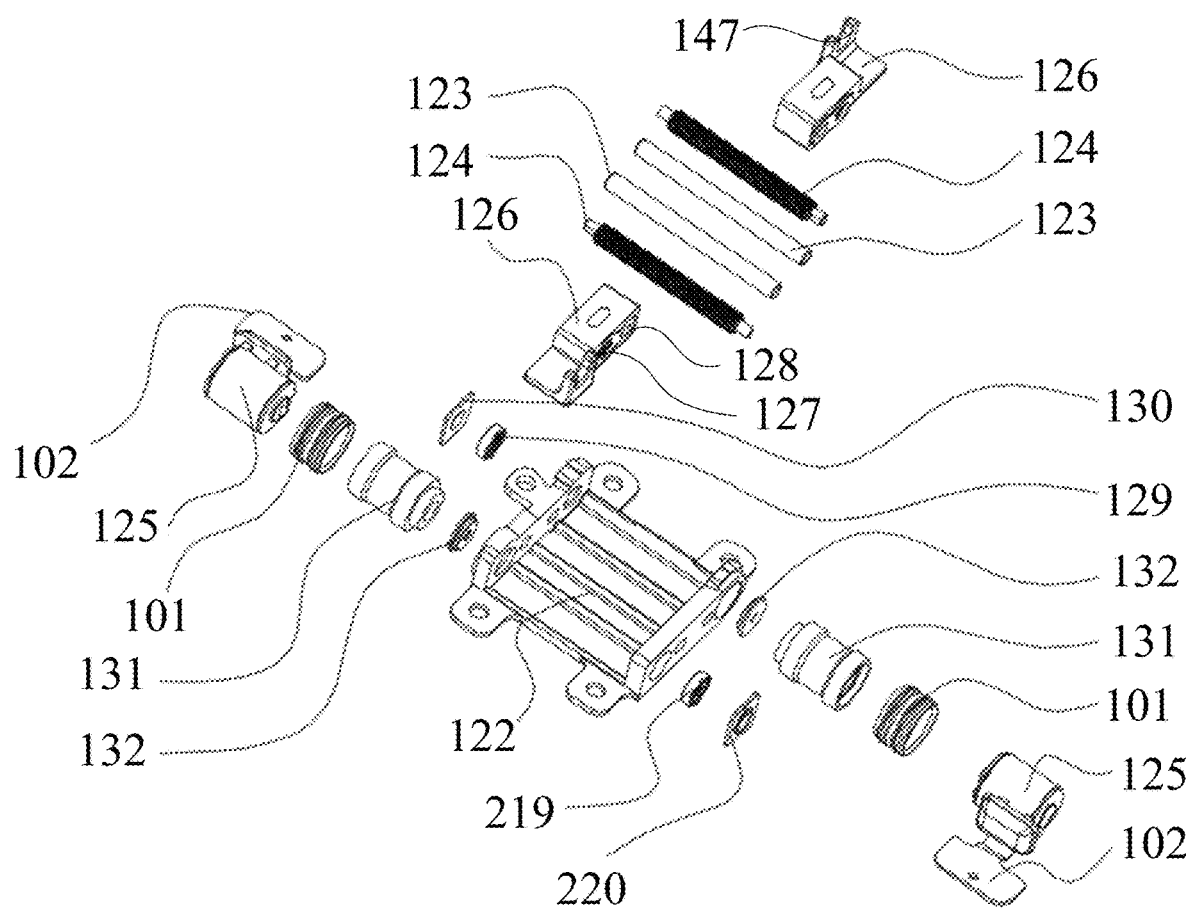
FIG. 9 is a partial exploded view of a driving assembly according to an illustrative embodiment of the present disclosure.

FIG. 7 is a schematic view of fit between a driving assembly 120 and a slide rail assembly 110 according to an illustrative embodiment of the present disclosure, FIG. 8 is a partial schematic view of a driving assembly 120 according to an illustrative embodiment of the present disclosure, and FIG. 9 is a partial exploded view of a driving assembly 120 according to an illustrative embodiment of the present disclosure. In some embodiments, referring to FIG. 7 to FIG. 9, the driving assembly 120 further includes a driving assembly bracket 122 fixed to the housing assembly 210, the driving unit 121 includes a first guide rod 123, a transmission lead screw 124, a driving member 125, and a push member 126, the first guide rod 123 and the transmission lead screw 124 are assembled to the driving assembly bracket 122, the driving member 125 is connected to an end of the transmission lead screw 124, and the driving member 125 is configured to drive the transmission lead screw 124 to rotate. The push member 126 is provided with a transmission hole 127 and a sliding hole 128, the transmission lead screw 124 is connected in the transmission hole 127 is in a transmission manner, the first guide rod 123 is slidably fitted in the sliding hole 128, and the push member 126 is configured to drive the slide rail 112 to slide. When the driving member 125 drives the transmission lead screw 124 to rotate, the rotating transmission lead screw 124 drives the push member 126 to move in a straight line along an axial direction of the transmission lead screw 124. The first guide rod 123 provides guidance for the push member 126 to ensure that the push member 126 moves stably, and the push member 126 drives the slide rail 112 to slide. It may be understood that, an inner wall of the transmission hole 127 is provided with a transmission thread fitted with the transmission lead screw 124, so that the push member 126 can move linearly under the drive of the transmission lead screw 124. As an example, the push member 126 may adopt powder metallurgy and plastic double-color injection molding. The plastic may be daicel (also referred to as polyformaldehyde or POM). The plastic is formed on the inner wall of the transmission hole 127 to provide a lubricating effect and facilitate the transmission between the transmission hole 127 and the transmission lead screw 124.

As an example, the driving member 125 includes a stepping motor. The stepping motor is an open-loop control stepping motor that converts an electrical pulse signal into an angular or linear displacement. In the case of non-overload, a rotation speed and a stop position of the stepping motor only depend on a frequency and a pulse number of a pulse signal, and are not affected by a load change. When a control chip of the stepping motor receives a pulse signal, the stepping motor is driven to rotate by a fixed angle in a set direction. A driving shaft of the stepping motor rotates step by step by the fixed angle. The angular displacement may be controlled by controlling the number of pulses so as to achieve a purpose of accurate positioning. The rotation speed and acceleration of the stepping motor may also be controlled by controlling a pulse frequency, so as to achieve the purpose of adjusting the speed and outputting a rotation torque. The driving member 125 may be connected to a flexible circuit board 102. The flexible circuit board 102 may be provided with a driver chip to control the operation of the driving member 125.

As an example, still referring to FIG. 9, an end of the transmission lead screw 124 may be fitted in a bearing 129. The bearing 129 may be assembled to the driving assembly bracket 122 through a bearing press plate 130. In this way, the transmission lead screw 124 can rotate. The bearing press plate 130 is configured to press the bearing 129. When the bearing 129 is not fixed with spot welding, the bearing 129 is pressed by using the bearing press plate 130, and the bearing press plate 130 may be fixed to the driving assembly bracket 122 by spot welding. The bearing press plate 130 may be made of a stainless steel metal material.

In some embodiments, still referring to FIG. 9, the driving unit 121 further includes a reduction gearbox 131. One end of the reduction gearbox 131 is connected to the transmission lead screw 124, and the other end of the reduction gearbox 131 is connected to the driving member 125. The reduction gearbox 131 may amplify the torque of the driving member 125 to drive the transmission lead screw 124 to rotate, thus allowing the push member 126 to move linearly on the transmission lead screw 124. The reduction gearbox 131 may be connected to the transmission lead screw 124 through a first lead screw bushing 132.

Figure 10:
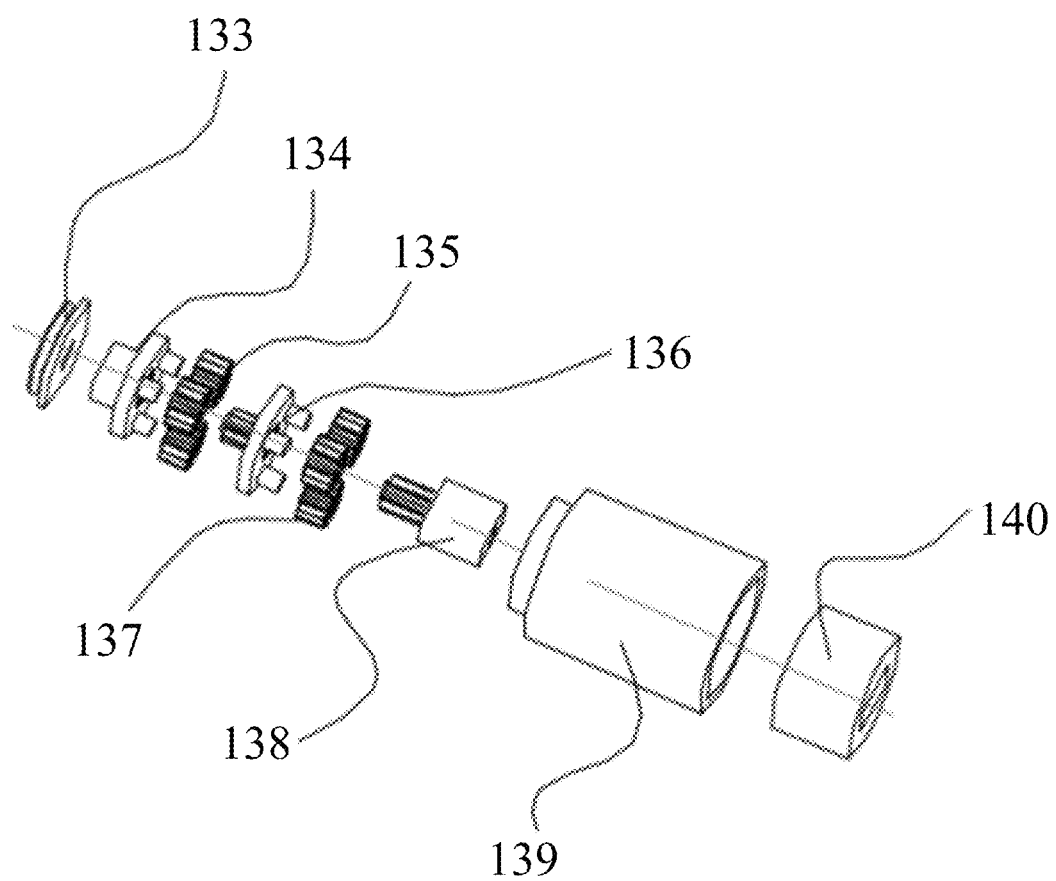
FIG. 10 is an exploded view of a reduction gearbox according to an illustrative embodiment of the present disclosure.

FIG. 10 is an exploded view of a reduction gearbox 131 according to an illustrative embodiment of the present disclosure. In some embodiments, referring to FIG. 10, the reduction gearbox 131 includes a second lead screw bushing 133, a secondary wheel carrier 134, a secondary planetary gear 135, a primary wheel carrier 136, a primary planetary gear 137, a motor gear 138, a gear retaining ring 139, and a motor gear bushing 140. The secondary planetary gear 135 is assembled to the secondary wheel carrier 134. The primary planetary gear 137 is assembled to the primary wheel carrier 136. The primary wheel carrier 136, the secondary wheel carrier 134, and the motor gear 138 are all assembled in the gear retaining ring 139. The motor gear 138 is fixedly connected to an output shaft of the driving member 125. The secondary wheel carrier 134 is fixed to the transmission lead screw 124. The torque of the driving member 125 is reduced through two stages of planetary gears, and a torque several times or dozens of times greater than the torque of the driving member 125 is outputted to the transmission lead screw 124 to drive the transmission lead screw 124 to rotate.

In some embodiments, still referring to FIG. 9, the driving unit 121 further includes a damping member 101. The damping member 101 is fitted over an outer surface of the reduction gearbox 131 to absorb an abnormal sound and produce a damping effect. As an example, the damping member 101 is injection-molded from a flexible glue material.

Figure 11:
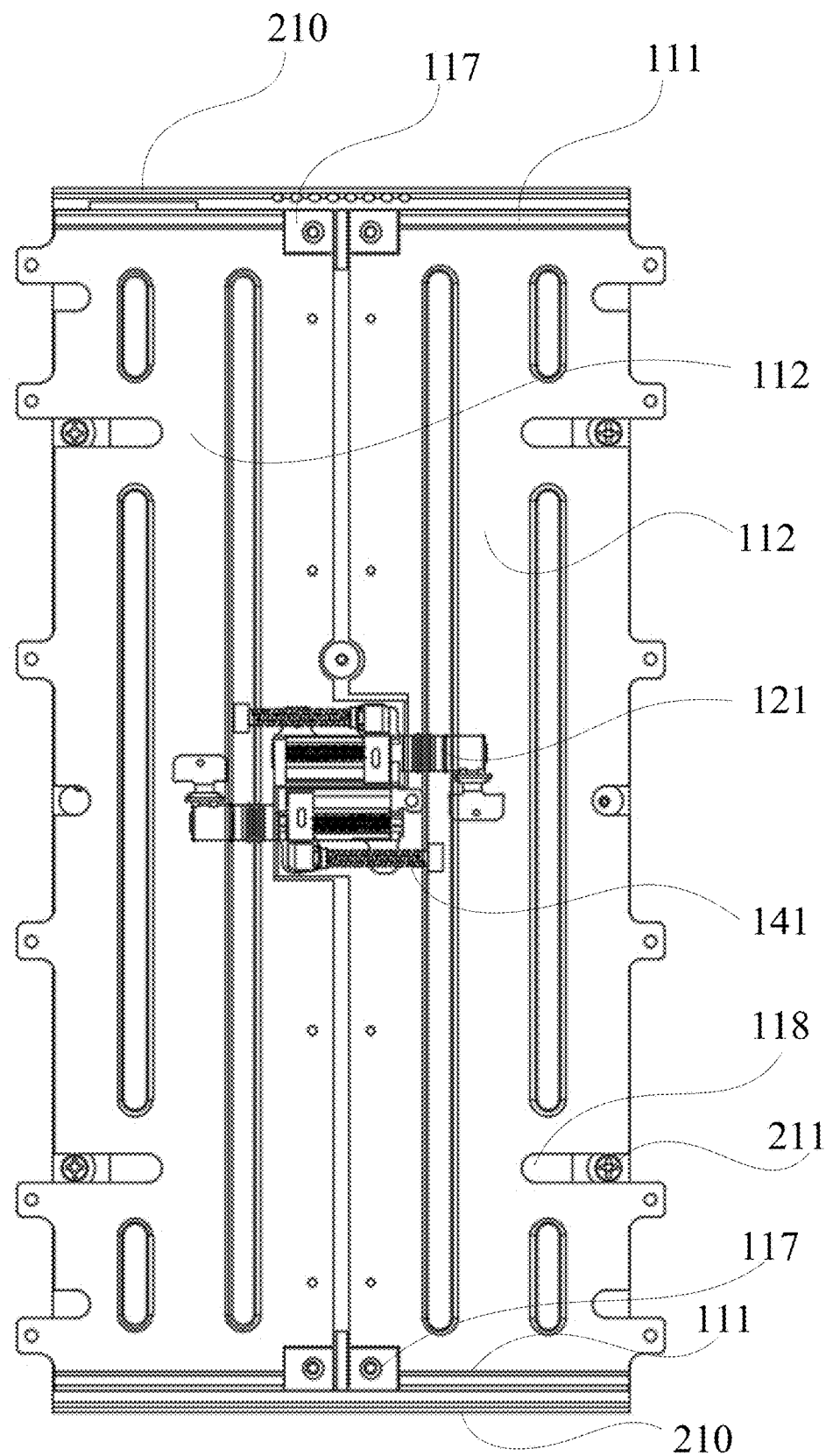
FIG. 11 is a schematic view of fit among a slide rail assembly, a driving assembly, and a housing assembly according to an illustrative embodiment of the present disclosure.
Figure 12:
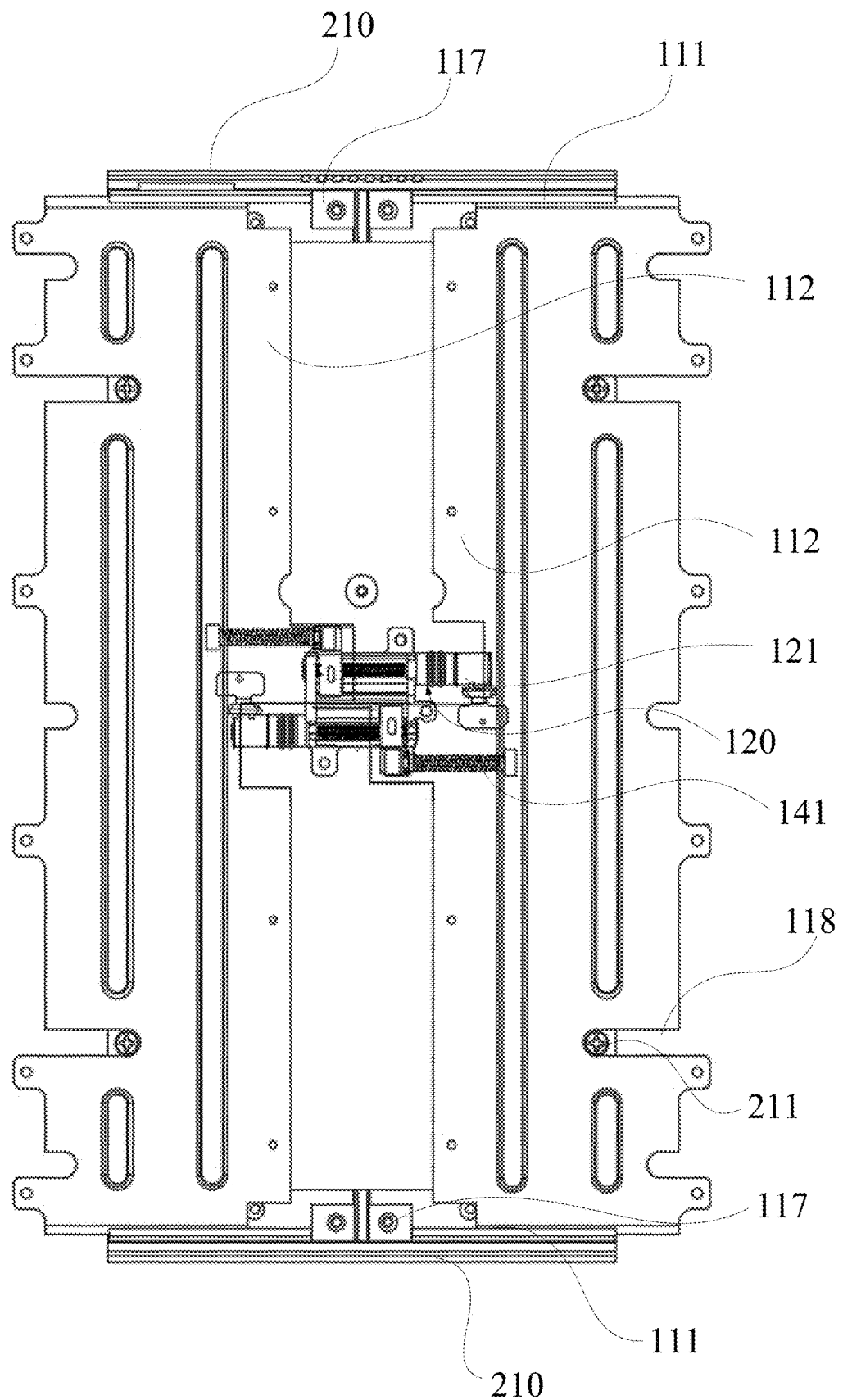
FIG. 12 is a schematic view of fit among a slide rail assembly, a driving assembly, and a housing assembly according to an illustrative embodiment of the present disclosure.
Figure 13:
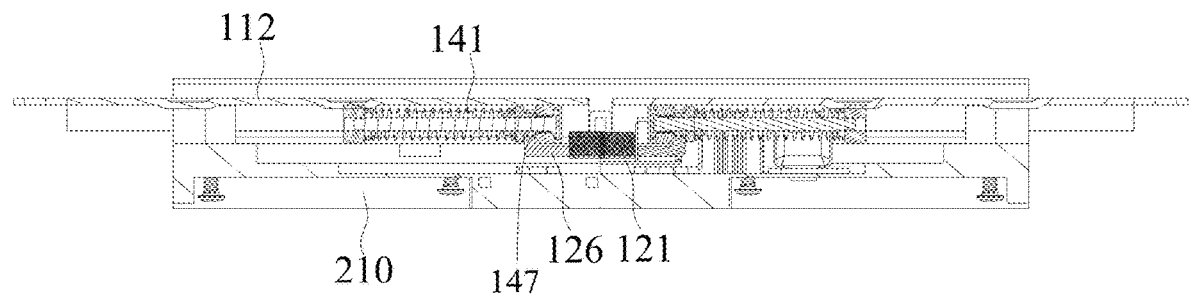
FIG. 13 is a partial sectional view of a slide rail assembly, a driving assembly, and a housing assembly according to an illustrative embodiment of the present disclosure.

FIG. 11 is a schematic view of fit among a slide rail assembly 110, a driving assembly 120, and a housing assembly 210 according to an illustrative embodiment of the present disclosure, FIG. 12 is a schematic view of fit among a slide rail assembly 110, a driving assembly 120, and a housing assembly 210 according to an illustrative embodiment of the present disclosure, and FIG. 13 is a partial sectional view of a slide rail assembly 110, a driving assembly 120, and a housing assembly 210 according to an illustrative embodiment of the present disclosure. In some embodiments, referring to FIG. 11 to FIG. 13, the driving unit 121 further includes an elastic buffering assembly 141. The elastic buffering assembly 141 is fixed to the slide rail 112, and the elastic buffering assembly 141 is connected to the push member 126. In this way, the elastic buffering assembly 141 is pushed by the push member 126 so that the slide rail 112 can slide stably.

Figure 14:
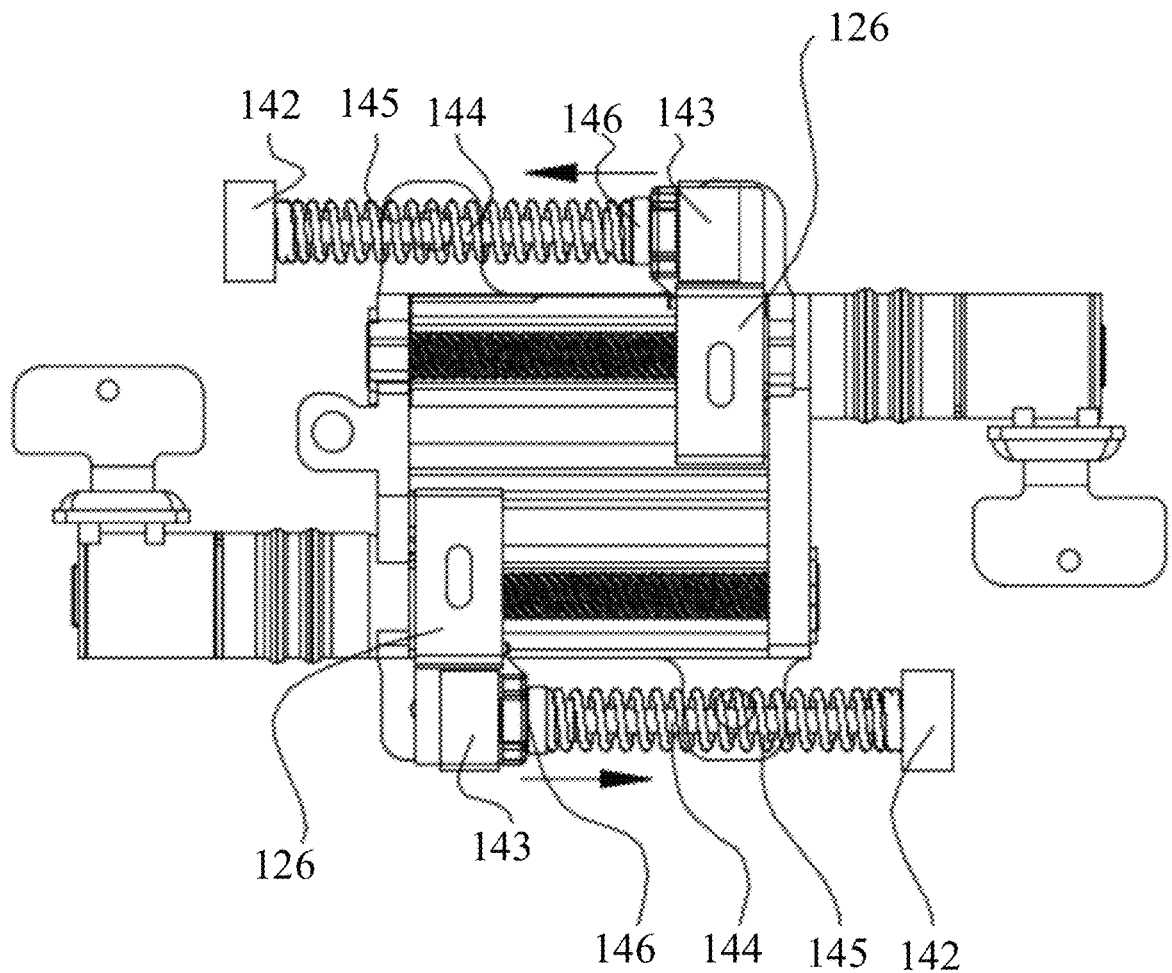
FIG. 14 is a schematic view of a driving assembly according to an illustrative embodiment of the present disclosure.

FIG. 14 is a schematic view of a driving assembly 120 according to an illustrative embodiment of the present disclosure. In some embodiments, referring to FIG. 14, the elastic buffering assembly 141 includes a first fixed portion 142, a second fixed portion 143, a second guide rod 144, and a first elastic member 145. The first fixed portion 142 and the second fixed portion 143 are fixed to the slide rail 112, the second guide rod 144 is fixed between the first fixed portion 142 and the second fixed portion 143, the first elastic member 145 is fitted over the second guide rod 144, and the push member 126 pushes the first elastic member 145 to stretch and retract on the second guide rod 144. In this way, the first elastic member 145 is pushed by the push member 126 to stretch and retract on the second guide rod 144, so that the first elastic member 145 applies a force to the first fixed portion 142 or the second fixed portion 143, and then the slide rail 112 is stably pushed to slide. As an example, one end of the second guide rod 144 is fixed to the first fixed portion 142 in a thread form, and the other end of the second guide rod 144 abuts against the second fixed portion 143, so as to facilitate disassembly and assembly of the elastic buffering assembly 141 and the slide rail 112. In addition, one end of the second guide rod 144 may also be welded to the first fixed portion 142, and the other end of the second guide rod 144 may also be welded to the second fixed portion 143.

In some embodiments, still referring to FIG. 14, the elastic buffering assembly 141 further includes a guide sleeve 146. The guide sleeve 146 is slidably fitted over the second guide rod 144 and is connected to an end of the first elastic member 145, and the push member 126 is connected to the guide sleeve 146. The push member 126 pushes the guide sleeve 146 to allow the guide sleeve 146 to drive the first elastic member 145 to slidingly stretch and retract on the second guide rod 144, so as to stably push the slide rail 112 to slide. As an example, the push member 126 is provided with an engaging slot 147. The guide sleeve 146 is engaged in the engaging slot 147.

Figure 15:
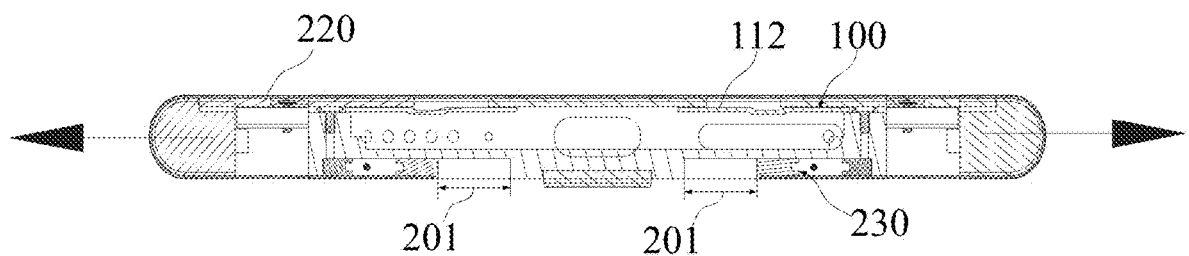
FIG. 15 is a partial sectional view of an electronic device according to an illustrative embodiment of the present disclosure.

The electronic device provided in the embodiments of the present disclosure includes, but is not limited to, a mobile phone, a tablet computer, an iPad, a digital broadcast terminal, a messaging device, a game console, medical equipment, fitness equipment, a personal digital assistant, a smart wearable device, a smart TV, a sweeping robot, a smart speaker, a vehicle-mounted device, and the like. FIG. 15 is a partial sectional view of an electronic device according to an illustrative embodiment of the present disclosure. Referring to FIG. 15, the electronic device provided in some embodiments of the present disclosure includes a housing assembly 210, any one of the sliding mechanisms 100 described above, and a flexible screen 220.

The housing assembly 210 may include a middle frame configured to assemble and protect various components of the electronic device. As an example, the housing assembly 210 may be made of a metal material such as an aluminum alloy. The housing assembly 210 may be formed by Computerised Numerical Control Machine (CNC) process and a nanometer injection molding process.

The sliding mechanism 100 is assembled to the housing assembly 210. The slide rail 112 of the slide rail assembly 110 in the sliding mechanism 100 includes a front surface and a rear surface. It needs to be noted that, the rear surface of the slide rail 112 may face the middle frame.

A part of the flexible screen 220 is arranged on the front surface of the slide rail 112 and fixed to the housing assembly 210, at least one end of the flexible screen 220 is arranged to an edge or the rear surface of the slide rail 112, the slide rail 112 slides from the housing assembly 210 to the outside to allow the flexible screen 220 to stretch, and the slide rail 112 slides from the outside to the housing assembly 210 to allow the flexible screen 220 to retract.

According to the electronic device provided in the embodiment of the present disclosure, the part of the flexible screen 220 is arranged on the front surface of the slide rail 112 and fixed to the housing assembly 210, and at least one end of the flexible screen 220 is arranged to the edge or the rear surface of the slide rail 112. When the slide rail 112 slides from the housing assembly 210 to the outside, the flexible screen 220 stretches, so as to increase a display area of the flexible screen 220. When the slide rail 112 slides from the outside to the housing assembly 210, the flexible screen 220 retracts, so as to reduce the display area of the flexible screen 220. With the driving unit 121, the slide rail 112 can be driven to slide to any position in its maximum stroke, so that the flexible screen 220 of the electronic device can display in different sizes, thereby improving the user experience. Compared with a foldable screen, the weight is reduced, and hence the electronic device is convenient for the user to carry, thus enhancing the market competitiveness.

Figure 16:
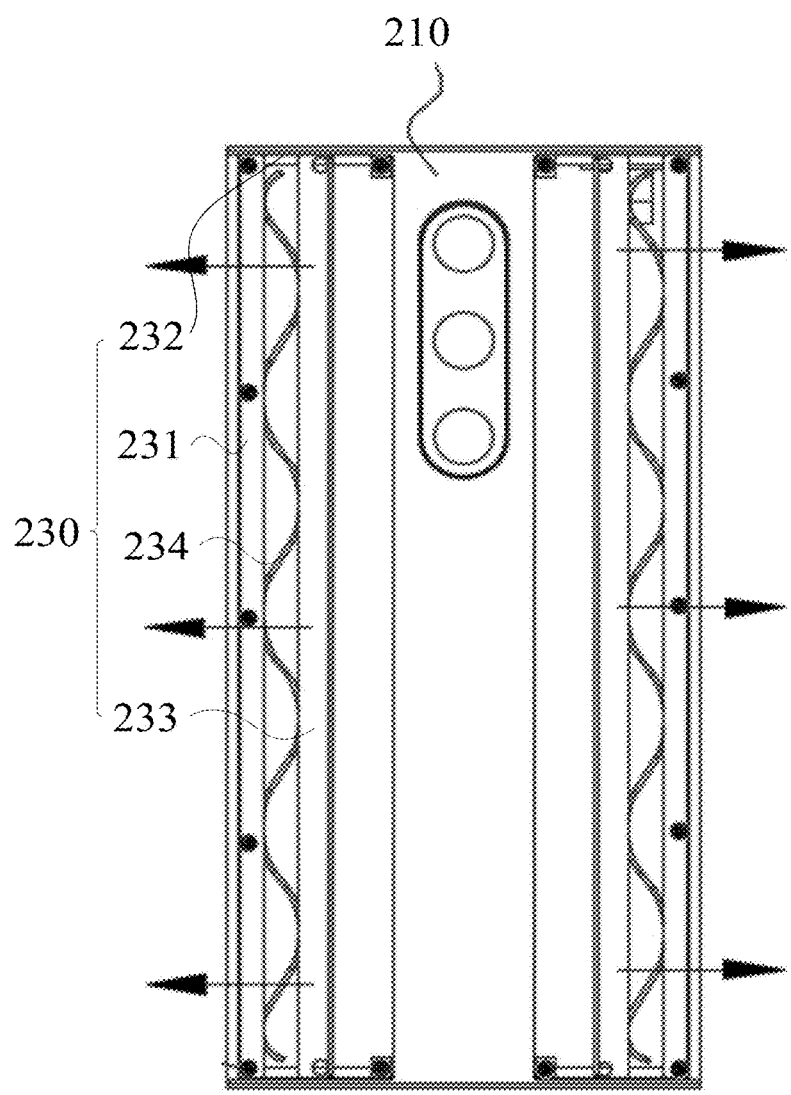
FIG. 16 is a partial schematic view of a flexible screen of an electronic device in a stretched state according to an illustrative embodiment of the present disclosure.
Figure 17:
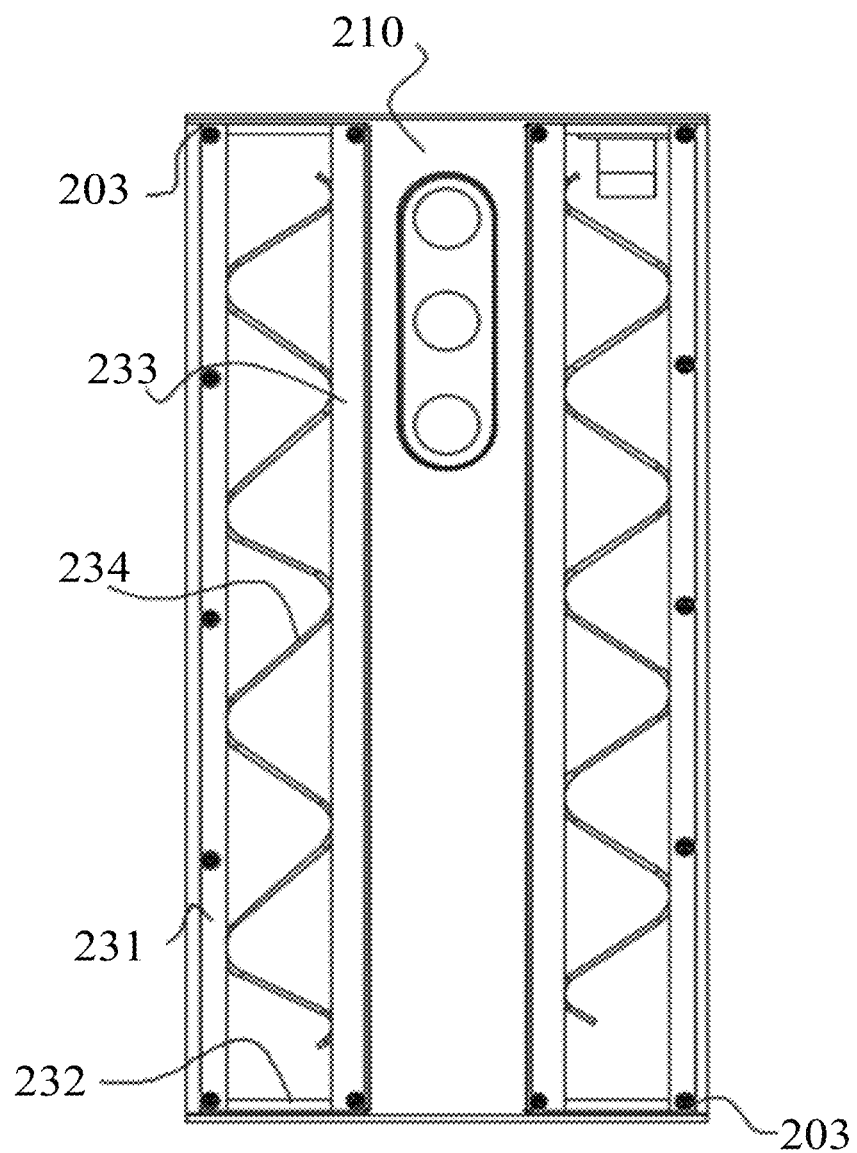
FIG. 17 is a partial schematic view of a flexible screen of an electronic device in a retracted state according to an illustrative embodiment of the present disclosure.

FIG. 16 is a partial schematic view of a flexible screen 220 of an electronic device in a stretched state according to an illustrative embodiment of the present disclosure, and FIG. 17 is a partial schematic view of a flexible screen 220 of an electronic device in a retracted state according to an illustrative embodiment of the present disclosure. In some embodiments, referring to FIG. 15 to FIG. 17, the electronic device further includes at least one elastic stretch and retraction assembly 230 arranged on a rear surface of the slide rail assembly 110 and assembled to the housing assembly 210, an end of the flexible screen 220 is connected to the elastic stretch and retraction assembly 230, and the elastic stretch and retraction assembly 230 is forced to stretch and retract by the end of the flexible screen 220. The end of the flexible screen 220 is limited by the elastic stretch and retraction assembly 230, so that the flexible screen 220 can stably stretch and retract, thus improving the user experience.

Figure 18:
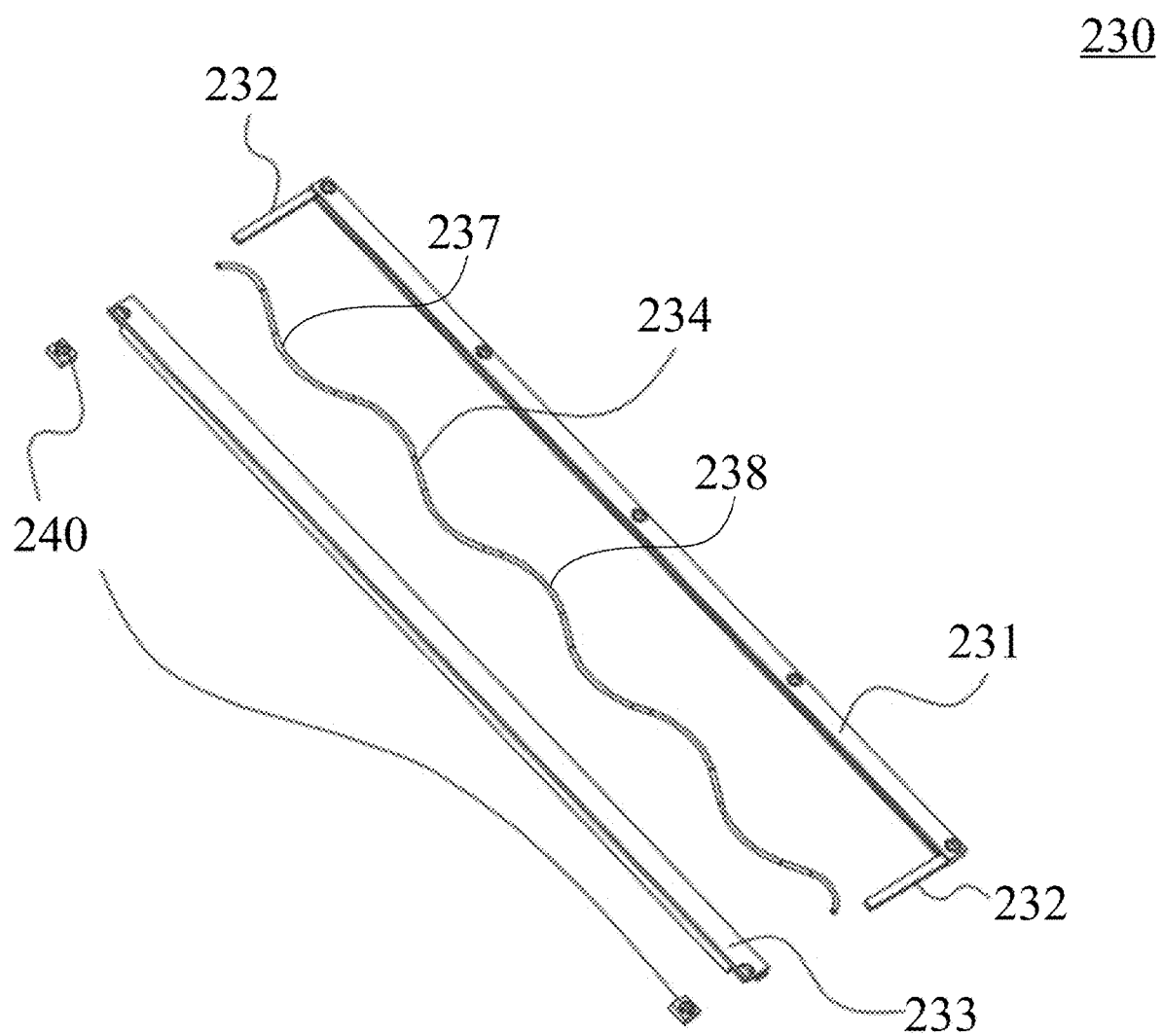
FIG. 18 is an exploded view of an elastic stretch and retraction assembly according to an illustrative embodiment of the present disclosure.
Figure 19:
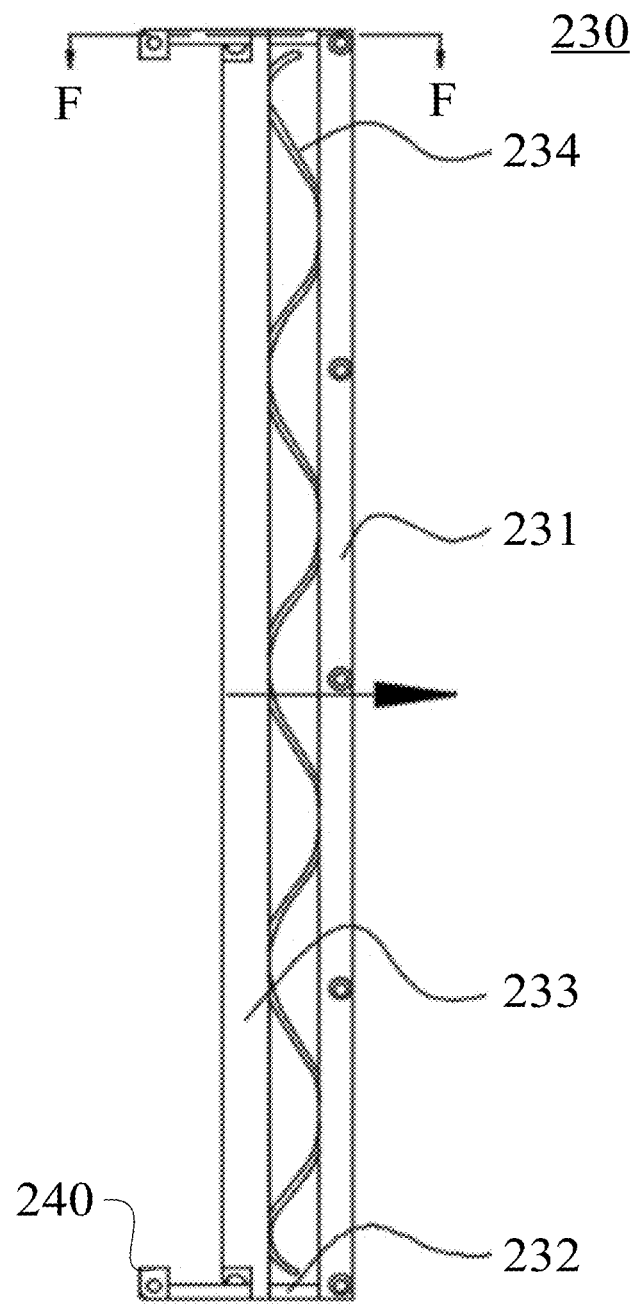
FIG. 19 is a schematic view of an elastic stretch and retraction assembly when a flexible screen is in a stretched state according to an illustrative embodiment of the present disclosure.
Figure 20:
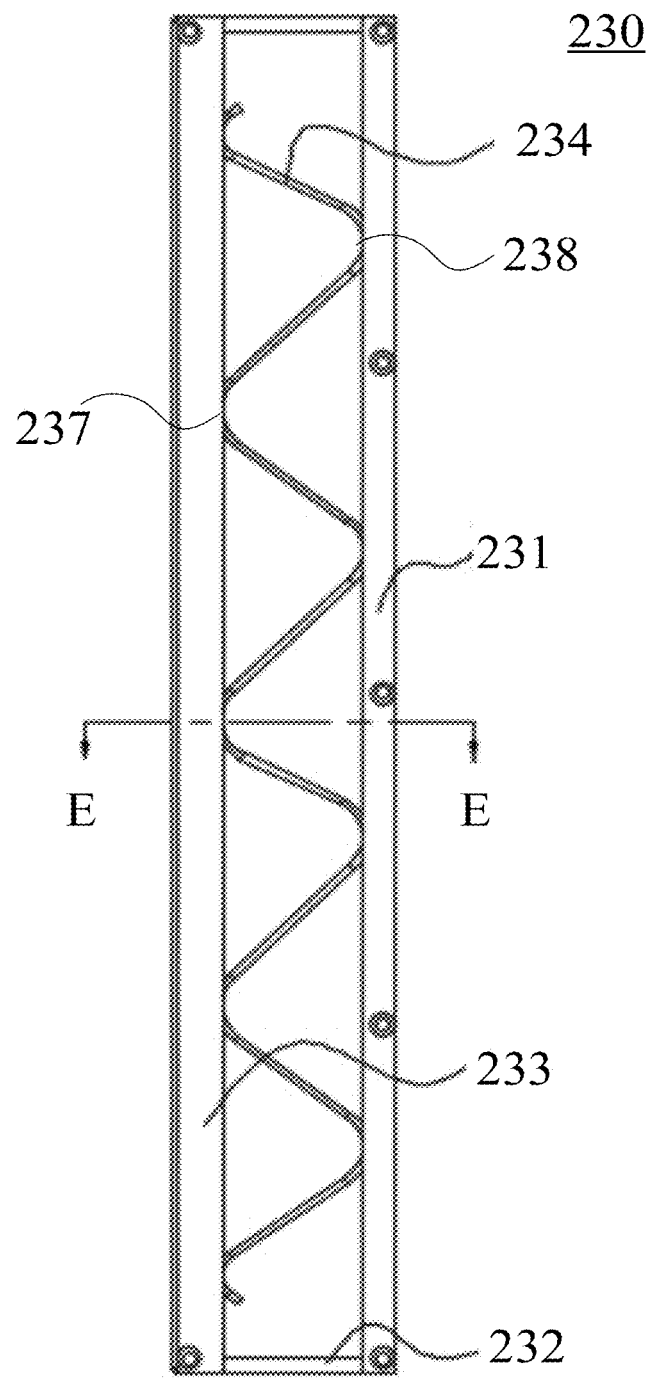
FIG. 20 is a schematic view of an elastic stretch and retraction assembly when a flexible screen is in a retracted state according to an illustrative embodiment of the present disclosure.

FIG. 18 is an exploded view of the elastic stretch and retraction assembly 230 according to an illustrative embodiment of the present disclosure, FIG. 19 is a schematic view of an elastic stretch and retraction assembly 230 when a flexible screen 220 is in an stretched state according to an illustrative embodiment of the present disclosure, and FIG. 20 is a schematic view of an elastic stretch and retraction assembly 230 when a flexible screen 220 is in a retracted state according to an illustrative embodiment of the present disclosure. Referring to FIG. 18 to FIG. 20, the elastic stretch and retraction assembly 230 includes a fixed bracket 231, a guide member 232, a sliding member 233, and a second elastic member 234. The fixed bracket 231 is fixed to the housing assembly 210 of the electronic device. The fixed bracket 231 may be a rod-shaped structure. The fixed bracket 231 may be fixed to the housing assembly 210 through a plurality of screws 203. The plurality of screws 203 may be arranged along an extension direction of the fixed bracket 231. The guide member 232 is connected to the fixed bracket 231. The guide member 232 may also be a rod-shaped structure. In this case, an extension direction of the guide member 232 may be perpendicular to that of the rod-shaped fixed bracket 231. The sliding member 233 is slidably connected to the guide member 232. The sliding member 233 is configured to connect with an end of the flexible screen 220. The guide member 232 provides guidance for the sliding member 233, and the end of the flexible screen 220 drives the sliding member 233 to slide on the guide member 232. The sliding member 233 may be configured to have a variety of structures, such as a rod-shaped structure. The rod-shaped sliding member 233 may be perpendicular to the rod-shaped guide member 232, and the rod-shaped sliding member 233 may also be parallel to the rod-shaped fixed bracket 231. The second elastic member 234 is arranged between the fixed bracket 231 and the sliding member 233. The second elastic member 234 is configured to reset the sliding member 233. When the flexible screen 220 stretches, the end of the flexible screen 220 drives the sliding member 233 to slide from the housing assembly 210 to the outside. Under a cushioning action of the second elastic member 234, the flexible screen 220 stably stretches. Referring to FIG. 15, reference numeral 201 represents a maximum distance by which the sliding member 233 can slide outwards. The second elastic member 234 is compressed between the fixed bracket 231 and the sliding member 233. When the flexible screen 220 retracts, the end of the flexible screen 220 drives the sliding member 233 to reset. Under resetting and cushioning actions of the elastic member 234, the sliding member 233 stably resets, which allows the flexible screen 220 to stably retract.

Figure 21:
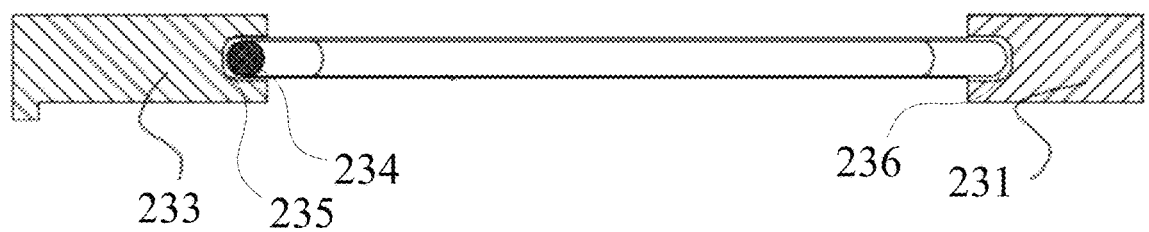
FIG. 21 is a sectional view of the elastic stretch and retraction assembly in FIG. 20 along an E-E line.

FIG. 21 is a sectional view of the elastic stretch and retraction assembly 230 in FIG. 20 along an E-E line. In some embodiments, referring to FIG. 21, the sliding member 233 is provided with a first limiting slot 235, the fixed bracket 231 is provided with a second limiting slot 236 opposite to the first limiting slot 235, the second elastic member 234 is limited in the first limiting slot 235 and in the second limiting slot 236, and the second elastic member 234 stretches and retracts along a direction from the first limiting slot 235 to the second limiting slot 236. In this way, it is convenient for the second elastic member 234 to be assembled between the fixed bracket 231 and the sliding member 233, and it is convenient for the second elastic member 234 to stretch and retract along the direction from the first limiting slot 235 to the second limiting slot 236.

In some embodiments, still referring to FIG. 18, the second elastic member 234 includes a plurality of first abutting points 237 and a plurality of second abutting points 238, the first abutting points 237 abut in the first limiting slot 235, and the second abutting points 238 abut in the second limiting slot 236, so that the second elastic member 234 stably stretches and retracts between the fixed bracket 231 and the sliding member 233. In some embodiments, the first abutting points 237 and the second abutting points 238 are alternately arranged along an extension direction of the first limiting slot 235. As an example, the first abutting point 237 and two second abutting points 238 adjacent thereto form a bended corner structure, and the second abutting point 238 and two first abutting points 237 adjacent thereto form another bended corner structure, so that the second elastic member 234 presents a structure similar to a wavy line along the extension direction of the first limiting slot 235 or an extension direction of the second limiting slot 236. In this way, it is convenient for the second elastic member 234 to stably stretch and retract between the fixed bracket 231 and the sliding member 233, so that the sliding member 233 stably drives the end of the flexible screen 220 to stretch and retract, and then the flexible screen 220 can stably stretch and retract.

Further, in some embodiments, still referring to FIG. 18, the plurality of first abutting points 237 are uniformly distributed, and the plurality of second abutting points 238 are uniformly distributed. In this way, elastic forces generated by the plurality of first abutting points 237 are basically the same, and elastic forces generated by the plurality of second abutting points 238 are basically the same. Thus, it is more convenient for the second elastic member 234 to stably stretch and retract between the fixed bracket 231 and the sliding member 233, and the second elastic member 234 applies a stable force to the sliding member 233. Therefore, the sliding member 233 can stably stretch and retract under the drive of the end of the flexible screen 220.

Figure 22:
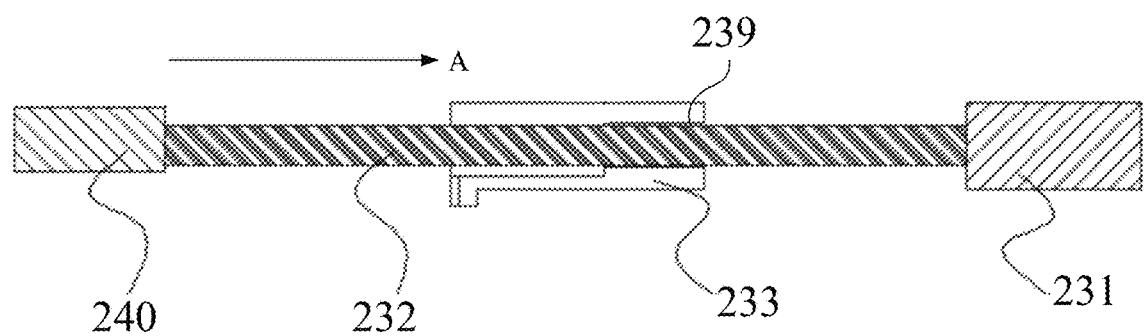
FIG. 22 is a sectional view of the elastic stretch and retraction assembly in FIG. 19 along an F-F line.

FIG. 22 is a sectional view of the elastic stretch and retraction assembly 230 in FIG. 19 along an F-F line. In some embodiments, referring to FIG. 22, the sliding member 233 is provided with a second sliding slot 239, and the guide member 232 is slidably fitted in the second sliding slot 239, so that the sliding member 233 can slide under a guiding action of the guide member 232. As an example, a cross section of the second sliding slot 239 is circular, square, or has other structures. Accordingly, the guide member 232 has a structure matching the second sliding slot 239.

In some embodiments, still referring to FIG. 18, two guide members 232 are provided, the two guide members 232 are oppositely arranged on two ends of the fixed bracket 231, and two ends of the sliding member 233 are slidably connected to the two guide members 232, respectively, so as to facilitate the sliding member 233 to stably slide on the guide members 232.

In some embodiments, still referring to FIG. 18, FIG. 19, FIG. 20, and FIG. 22, the elastic stretch and retraction assembly 230 further includes a limiting member 240, the limiting member 240 is fixed to the guide member 232, and the sliding member 233 slides between the limiting member 240 and the fixed bracket 231. This avoids the sliding member 233 from being separated from the guide member 232 when sliding on the guide member 232, and a maximum sliding stroke of the sliding member 233 on the guide member 232 is restricted through the cooperation of the limiting member 240 and the fixed bracket 231. In FIG. 19, when the flexible screen 220 stretches, the sliding member 233 may slide along a direction of an arrow A from the limiting member 240 to the fixed bracket 231. When the flexible screen 220 retracts, the sliding member 233 may slide to the limiting member 240 in an opposite direction of the arrow A. The limiting member 240 may be a block structure. As an example, the limiting member 240 may be fixed to the guide member 232 by welding.

In some embodiments, the limiting member 240 is further fixed to the housing assembly 210, to be firmly assembled to the housing assembly 210. As an example, the limiting member 240 is provided with a threaded hole, and the screw 203 penetrates the housing assembly 210 to be threadedly fitted in the threaded hole, so as to firmly secure the limiting member 240 to the housing assembly 210, which also allows the elastic stretch and retraction assembly 230 to be firmly secured to the housing assembly 210.

Figure 23:
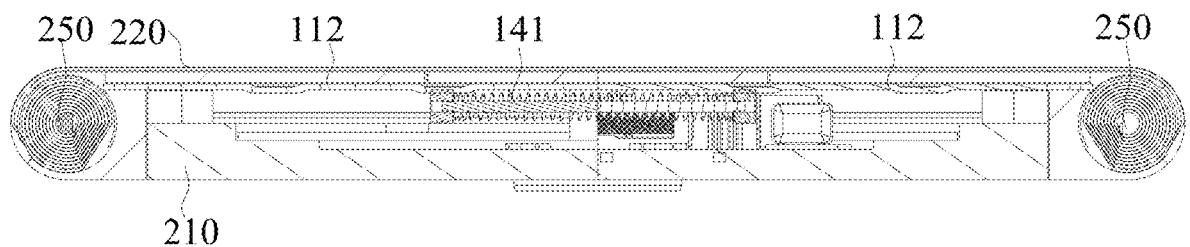
FIG. 23 is a partial sectional view of an electronic device according to an illustrative embodiment of the present disclosure.

FIG. 23 is a partial sectional view of an electronic device according to an illustrative embodiment of the present disclosure. In some embodiments, referring to FIG. 23, the electronic device further includes a reel assembly 250 fixed to the edge of the slide rail 112 sliding from the housing assembly 210 to the outside, another part of the flexible screen 220 is wound around the reel assembly 250 from the end of the flexible screen 220 in an stretchable and retractable manner, the slide rail 112 slides from the housing assembly 210 to the outside to allow the other part of the flexible screen 220 to stretch from the reel assembly 250, so as to allow the flexible screen 220 to stretch, and the slide rail 112 slides from the outside to the housing assembly 210 to allow the other part of the flexible screen 220 to retract to the reel assembly 250, so as to allow the flexible screen 220 to retract.

Figure 24:
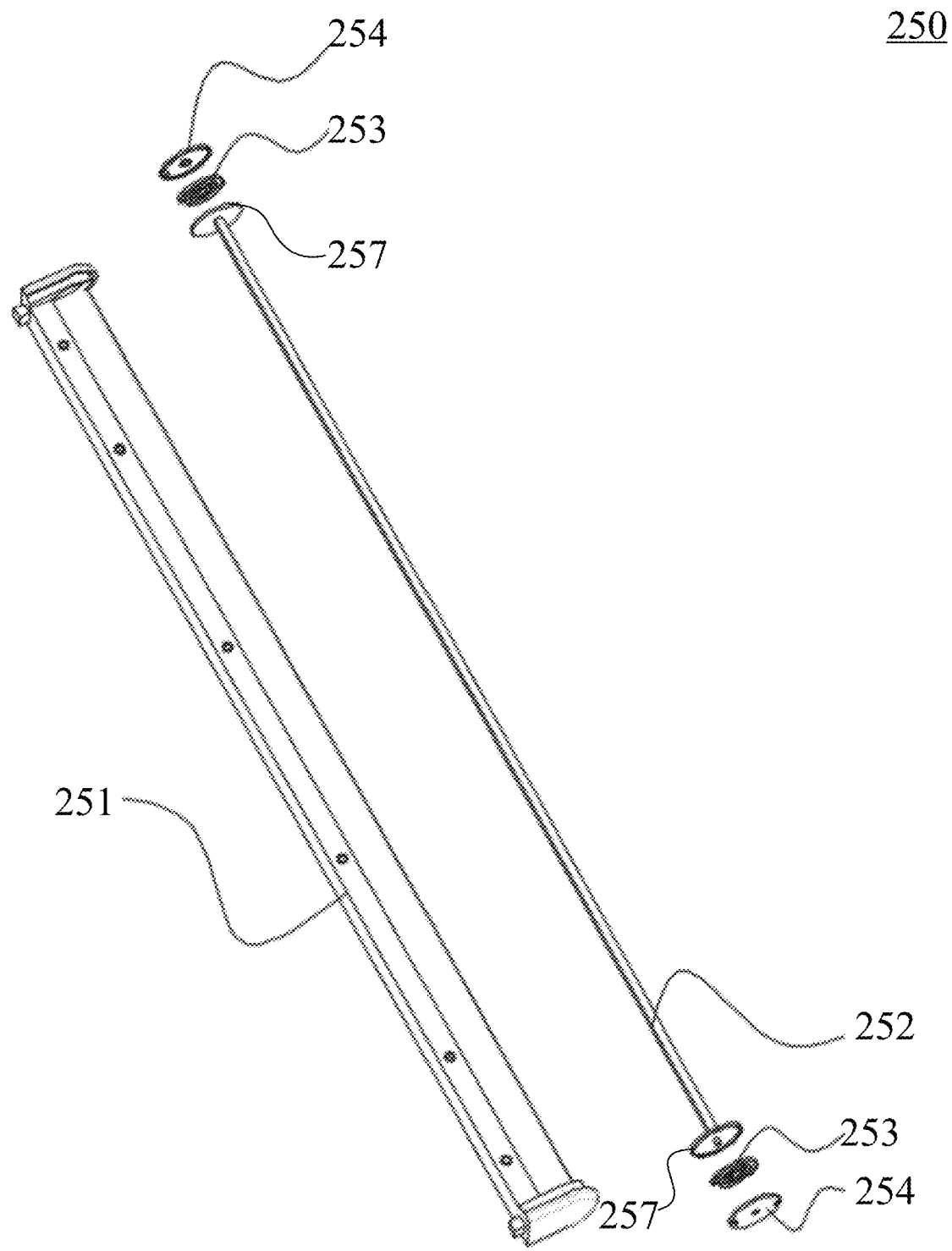
FIG. 24 is an exploded view of a reel assembly according to an illustrative embodiment of the present disclosure.
Figure 25:
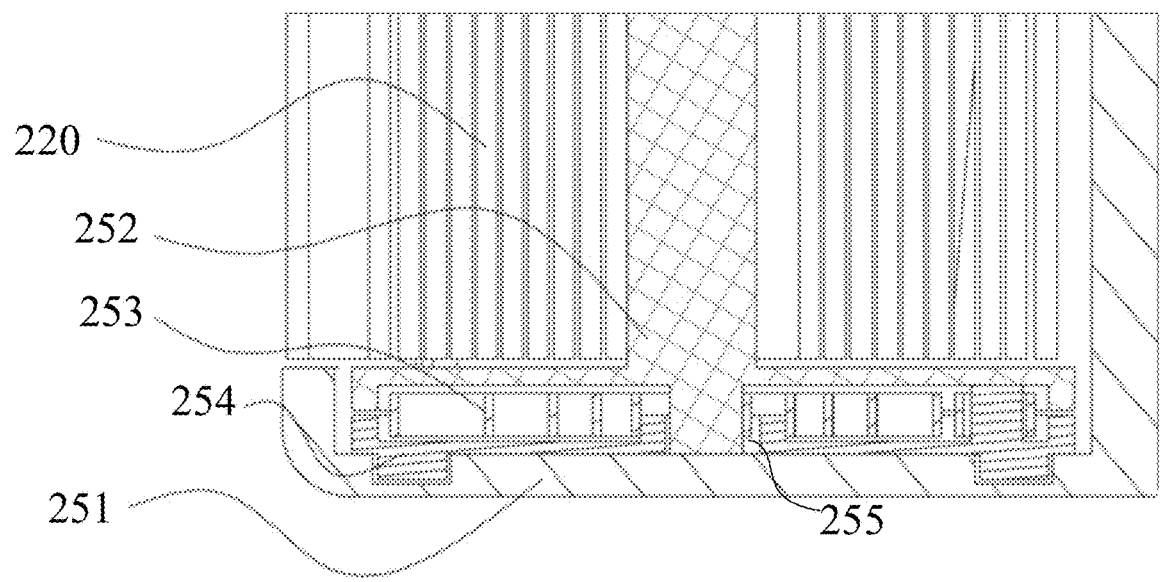
FIG. 25 is a partial sectional view of a reel assembly according to an illustrative embodiment of the present disclosure.
Figure 26:
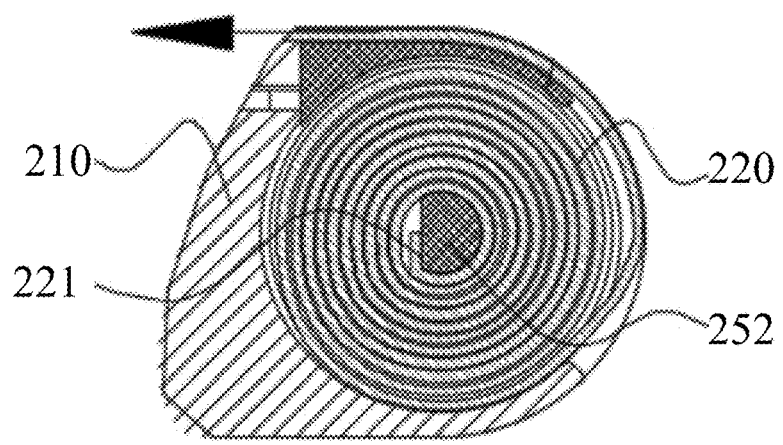
FIG. 26 is a side view of a reel assembly according to an illustrative embodiment of the present disclosure.
Figure 27:
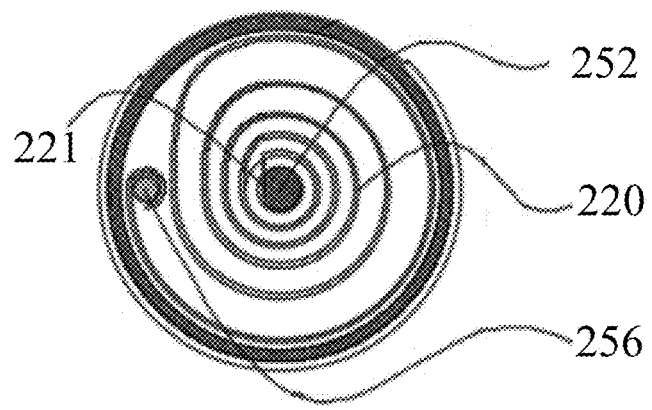
FIG. 27 is a side view of a reel assembly according to an illustrative embodiment of the present disclosure.

FIG. 24 is an exploded view of a reel assembly 250 according to an illustrative embodiment of the present disclosure, FIG. 25 is a partial sectional view of a reel assembly 250 according to an illustrative embodiment of the present disclosure, FIG. 26 is a side view of a reel assembly 250 according to an illustrative embodiment of the present disclosure, and FIG. 27 is a side view of a reel assembly 250 according to an illustrative embodiment of the present disclosure. In some embodiments, referring to FIG. 24 to FIG. 27, the reel assembly 250 includes a reel bracket 251, a rotating shaft 252, and a third elastic member 253. The reel bracket 251 is fixed to the edge of the slide rail 112. The rotating shaft 252 is rotatably assembled to the reel bracket 251. The third elastic member 253 is connected to the rotating shaft 252. The third elastic member 253 is configured to reset the rotating shaft 252. The other part of the flexible screen 220 is wound around the rotating shaft 252 from the end of the flexible screen, and the end of the flexible screen 220 may be referred to as a winding end 221. When the slide rail 112 slides from the housing assembly 210 to the outside, since a part of the flexible screen 220 is fixed to the housing assembly 210, another part of the flexible screen 220 wound around the rotating shaft 252 is released under a driving action of the stretched slide rail 112, so that the flexible screen 220 is in the stretched state, referring to FIG. 27. When the slide rail 112 slides from the outside to the housing assembly 210, the rotating shaft 252 rotates under a resetting action of the third elastic member 253, so that the other part of the flexible screen 220 is wound around the rotating shaft 252 and thus the flexible screen 220 is in the retracted state, referring to FIG. 26. As an example, the reel bracket 251 may be fixed to the edge of the slide rail 112 through the screws 203.

In some embodiments, still referring to FIG. 24 and FIG. 25, the reel assembly 250 further includes a fixed end cover 254. The fixed end cover 254 is fixed to the reel bracket 251, the fixed end cover 254 is provided with a shaft hole 255, and an end of the rotating shaft 252 is rotatably limited in the shaft hole 255. In this way, the rotating shaft 252 is rotatably assembled to the reel bracket 251.

In some embodiments, still referring to FIG. 24 and FIG. 25, the third elastic member 253 includes a volute spiral spring, the volute spiral spring includes a first end and a second end, the first end is connected to the rotating shaft 252, and the second end is connected to the fixed end cover 254. The volute spiral spring is easily available and facilitates the rotation and reset of the rotating shaft 252. Specifically, when the slide rail 112 slides from the housing assembly 210 to the outside, the rotating shaft 252 is driven to rotate to release the flexible screen 220 outwards, and at the same time, the rotating shaft 252 drives the volute spiral spring to rotate, allowing the volute spiral spring to produce an elastic force. When the slide rail 112 slides from the outside to the housing assembly 210, the direction of the elastic force produced by the volute spiral spring is opposite to a rotation direction of the rotating shaft 252, which allows the volute spiral spring to drive the rotating shaft 252 to rotate in the opposite direction, and allows the other part of the flexible screen 220 to be retracted and wound around the rotating shaft 252.

In some embodiments, still referring to FIG. 27, a surface of the fixed end cover 254 facing the volute spiral spring is provided with a limiting post 256, and the second end is connected to the limiting post 256. The arrangement of the limiting post 256 facilitates the second end of the volute spiral spring to be connected to the fixed end cover 254. As an example, the second end of the volute spiral spring may be fixed to the limiting post 256 by winding or welding.

In some embodiments, still referring to FIG. 24 and FIG. 25, a rotating shaft disc 257 is fitted over the rotating shaft 252, and the volute spiral spring is located between the rotating shaft disc 257 and the fixed end cover 254. In this way, the volute spiral spring is stably limited between the rotating shaft disc 257 and the fixed end cover 254, which facilitates the volute spiral spring to rotate with the rotating shaft 252 and drive the rotating shaft 252 to rotate for resetting.

Figure 28:
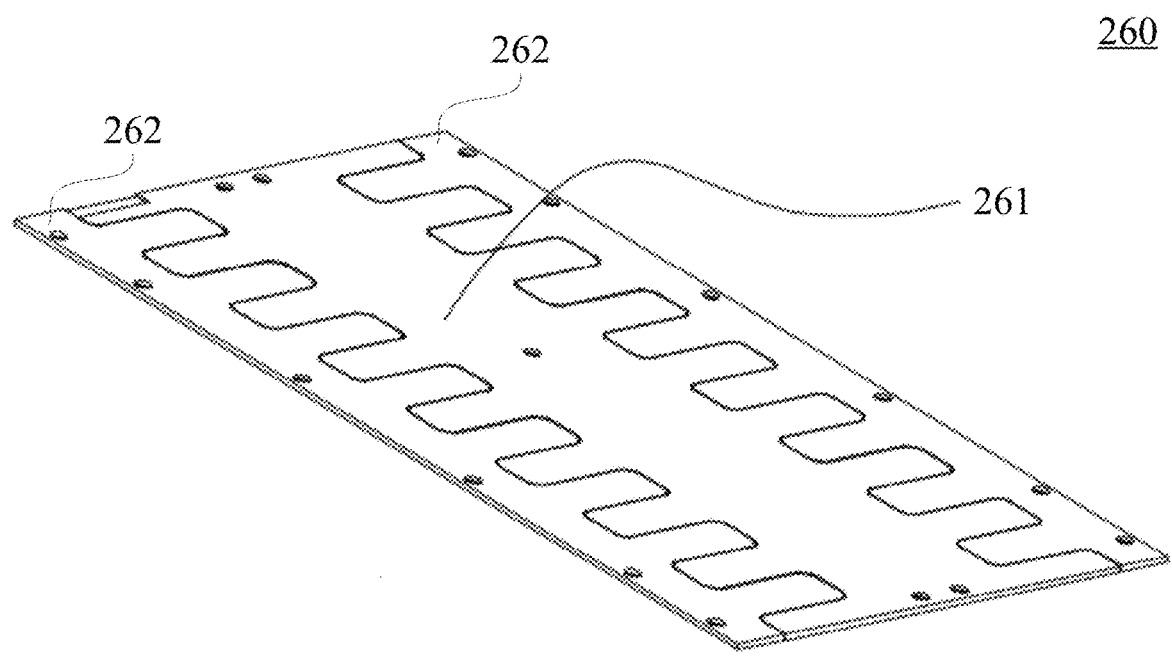
FIG. 28 is a schematic view of a support plate assembly retracted according to an illustrative embodiment of the present disclosure.
Figure 29:
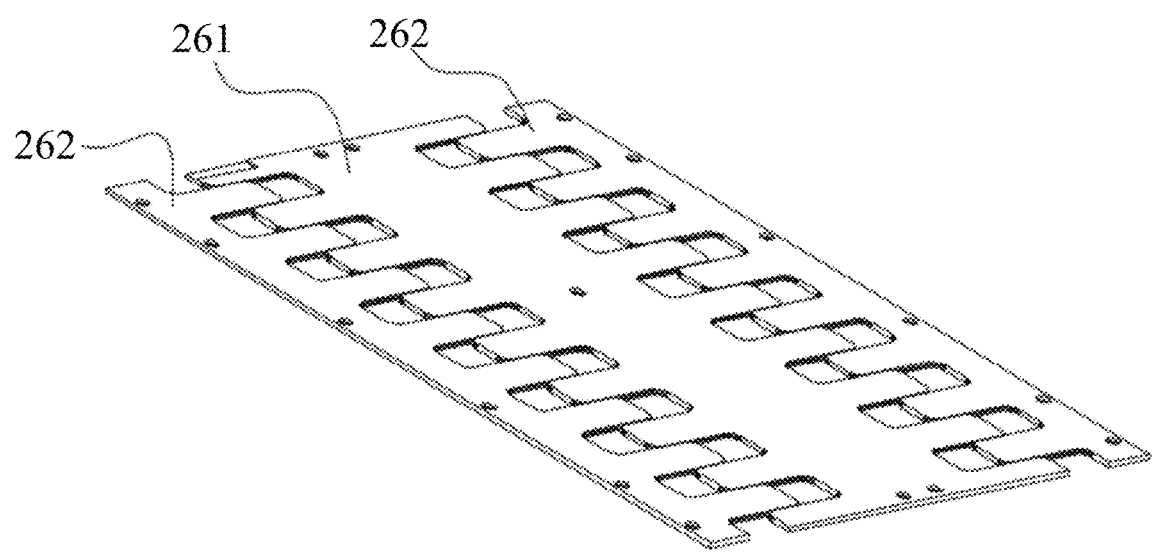
FIG. 29 is a schematic view of a support plate assembly stretched according to an illustrative embodiment of the present disclosure.

FIG. 28 is a schematic view of a support plate assembly 260 retracted according to an illustrative embodiment of the present disclosure, and FIG. 29 is a schematic view of a support plate assembly 260 stretched according to an illustrative embodiment of the present disclosure. In some embodiments, referring to FIG. 28 and FIG. 29, the electronic device further includes a support plate assembly 260. The support plate assembly 260 is arranged between the slide rail assembly 110 and the flexible screen 220. The support plate assembly 260 includes a fixed support plate 261 and at least one movable support plate 262, the fixed support plate 261 is fixed to the housing assembly 210, the movable support plate 262 is slidably connected to the fixed support plate 261, the movable support plate 262 is further connected to the slide rail 112, and the part of the flexible screen 220 is fixed to the fixed support plate 261. It needs to be noted that, the number of the movable support plates 262 may be equal to the number of the slide rails 112. The movable support plates 262 are connected to the slide rails 112 in a one-to-one correspondence. As an example, the movable support plate 262 includes a first movable support plate and a second movable support plate arranged opposite to each other. The first movable support plate is connected to the first slide rail 114, and the second movable support plate is connected to the second slide rail 115. The support plate assembly 260 is configured to support the flexible screen 220, thus ensuring that the flexible screen 220 will not collapse in the stretched and retracted states. The part of the flexible screen 220 may be bond to the fixed support plate 261 by a colloid.

Figure 30:
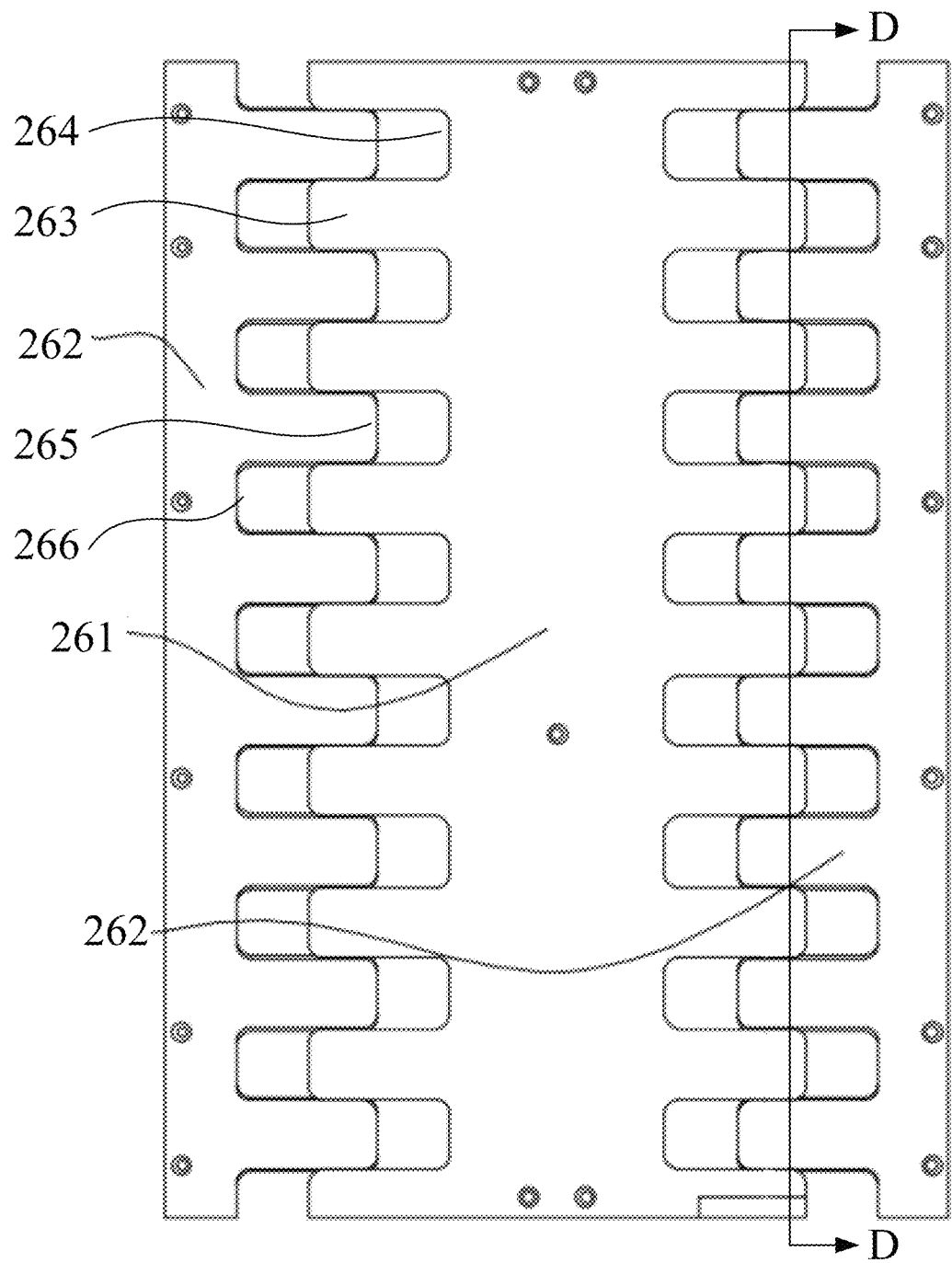
FIG. 30 is a schematic view of a support plate assembly stretched according to an illustrative embodiment of the present disclosure.

FIG. 30 is a schematic view of a support plate assembly 260 stretched according to an illustrative embodiment of the present disclosure. In some embodiments, referring to FIG. 30, an edge of the fixed support plate 261 is provided with a plurality of first convex portions 263 and a plurality of first concave portions 264, an edge of the movable support plate 262 is provided with a plurality of second convex portions 265 and a plurality of second concave portions 266, the second convex portions 265 are slidably connected to the first concave portions 264, and the second concave portions 266 are slidably connected to the first convex portions 263. In this way, through the fit of the first convex portions 263 and the second concave portions 266 and the fit of the first concave portions 264 and the second convex portions 265, surfaces of the movable support plate 262 and the fixed support plate 261 are flush after the support plate assembly 260 stretches, so as to flatly support the flexible screen 220. As an example, the plurality of first convex portions 263 and the plurality of first concave portions 264 are arranged alternately, and the plurality of second convex portions 265 and the plurality of second concave portions 266 are arranged alternately.

Figure 31:
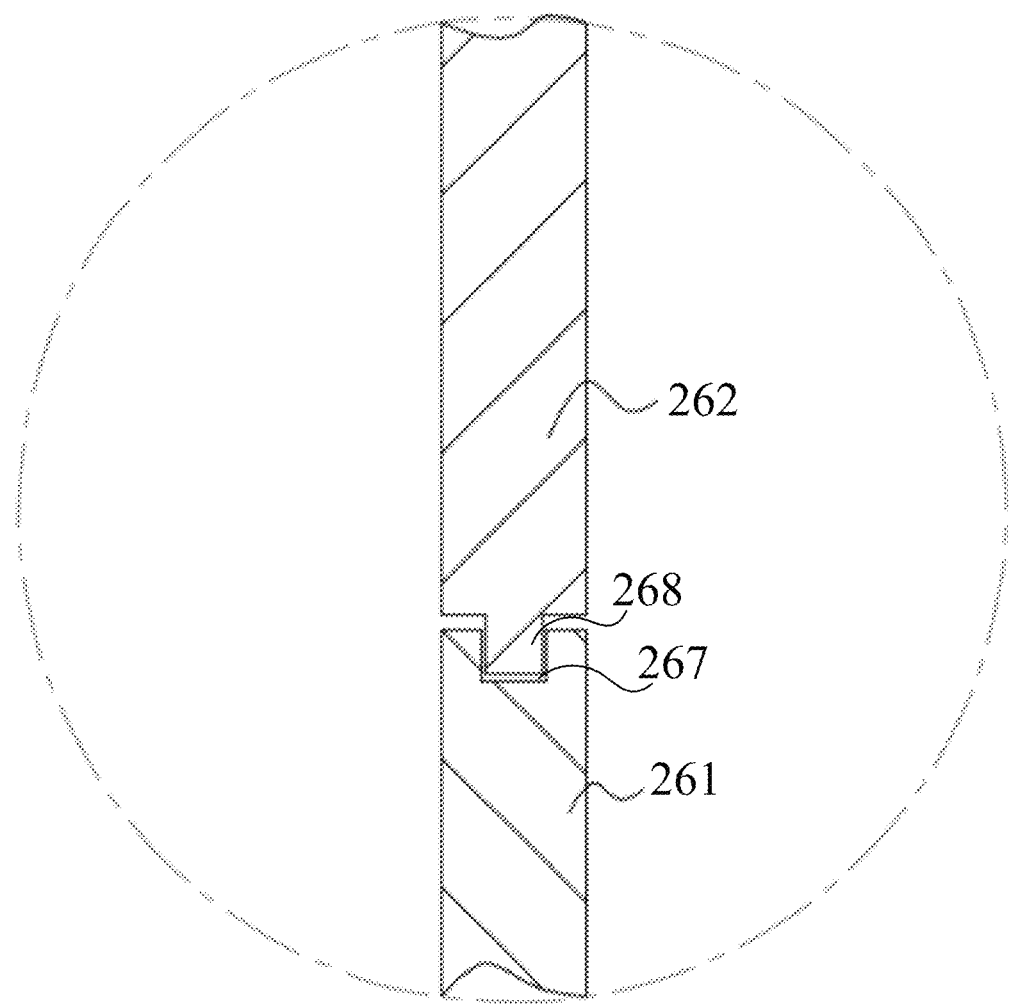
FIG. 31 is a partial enlarged view of the support plate assembly in FIG. 30 after being sectioned along a D-D line.

In some embodiments, one of an edge of the first convex portions 263 and an edge of the second concave portions 266 is provided with a third sliding slot, and the other one thereof is provided with a first sliding portion matching the third sliding slot. One of an edge of the second convex portions 265 and an edge of the first concave portions 264 is provided with a fourth sliding slot, and the other one thereof is provided with a second sliding portion matching the fourth sliding slot. This facilitates the surface flatness of the support plate assembly 260. As an example, a cross section of the third sliding slot may be a T-slot structure, and the first sliding portion has a structure matching the third sliding slot. As an example, a cross section of the fourth sliding slot may be a T-slot structure, and the second sliding portion has a structure matching the fourth sliding slot. FIG. 31 is a partial enlarged view of the support plate assembly 260 in FIG. 30 after being sectioned along a D-D line. Still referring to FIG. 31, the fixed support plate 261 may be provided with a third sliding slot 267 or a fourth sliding slot, and the movable support plate 262 may be provided with a first sliding portion 268 matching the third sliding slot 267 or a second sliding portion matching the fourth sliding slot.

In some embodiments, still referring to FIG. 11 and FIG. 12, an edge of the housing assembly 210 is provided with a limiting portion 211, and the slide rail 112 is provided with a third limiting slot 118. When the slide rail 112 slides from the housing assembly 210 to the outside, the limiting portion 211 is limited in the third limiting slot 118. In this way, through the fit of the limiting portion 211 and the third limiting slot 118, a maximum stroke of the sliding of the slide rail 112 from the housing assembly 210 to the outside is limited, thereby preventing the slide rail 112 from being separated from the housing assembly 210. The limiting portion 211 may be a bump structure, or the limiting portion 211 is a screw fixed to the housing assembly 210.

In some embodiments, the electronic device further includes a controller. The controller is connected to the driving unit 121 of the sliding mechanism 100. The controller is configured to control the driving unit 121 to drive the slide rail 112 to slide. As an example, the controller may include a central processing unit (CPU) of the electronic device. As an example, the driving member 125 is connected to a flexible circuit board. The flexible circuit board is provided with a driver chip. The flexible circuit board is connected to the controller of the electronic device through an elastic piece or a BTB (board-to-board) connector, to enable the controller to control the operation of the driving member 125. The flexible screen 220 sends a first instruction to the controller in response to a click operation. The controller sends a first drive instruction to the driver chip of the driving member 125 according to the first instruction. The driver chip controls, based on the first drive instruction, the driving member 125 to drive the transmission lead screw 124 to rotate around a first direction, so as to allow the slide rail 112 to stretch. The flexible screen 220 sends a second instruction to the controller in response to a click operation. The controller sends a second drive instruction to the driver chip of the driving member 125 according to the second instruction. The driver chip controls, based on the second drive instruction, the driving member 125 to drive the transmission lead screw 124 to rotate around a second direction different from the first direction, so as to allow the slide rail 112 to retract.

Based on the above, according to the sliding mechanism 100 and the electronic device provided in the embodiments of the present disclosure, the part of the flexible screen 220 is arranged on the front surface of the slide rail 112 and fixed to the housing assembly 210, and at least one end of the flexible screen 220 is arranged to the edge or the rear surface of the slide rail 112. When the slide rail 112 slides from the housing assembly 210 to the outside, the flexible screen 220 stretches, so as to increase the display area of the flexible screen 220. When the slide rail 112 slides from the outside to the housing assembly 210, the flexible screen 220 retracts, so as to reduce the display area of the flexible screen 220. With the driving unit 121, the slide rail 112 can be driven to slide to any position in its maximum stroke, so that the flexible screen 220 of the electronic device can display in different sizes, thereby improving the user experience. Compared with the foldable screen, the weight is reduced, and the electronic device is convenient for the user to carry, thus enhancing the market competitiveness. The support plate assembly 260 supports the flexible screen 220, to prevent the collapse of the flexible screen 220. Based on the connection of the elastic stretch and retraction assembly 230 with the end of the flexible screen 220, the flexible screen 220 can stably stretch and retract through the stretch and retraction of the elastic stretch and retraction assembly 230. Alternatively, based on the winding of the end of the flexible screen 220 around the reel assembly 250, the flexible screen 220 is released or withdrawn through the reel assembly 250, so that the flexible screen 220 can stably stretch and retract.

The above descriptions are only preferred embodiments of the present disclosure, and are not intended to limit the present disclosure. Any modification, equivalent replacement, improvement, and the like made within the spirit and principle of the present disclosure should fall within the protection scope of the present disclosure.

What is claimed is:

1. A sliding mechanism for an electronic device, comprising:
   a slide rail assembly comprising a fixed member and a slide rail, the fixed member being fixed to a housing assembly of the electronic device, the fixed member being provided with a sliding slot, and an end of the slide rail being slidably limited in the sliding slot; and
   a driving assembly fixed to the housing assembly, the driving assembly comprising a driving unit connected to the slide rail in a one-to-one correspondence, and the driving unit being configured to drive the slide rail to slide from the housing assembly to the outside and to slide from the outside to the housing assembly,
   wherein the driving unit further comprises an elastic buffering assembly, the elastic buffering assembly is fixed to the slide rail, and configured to drive the slide rail to slide,
   wherein the driving assembly further comprises a push member, the elastic buffering assembly is connected to the push member and the push member is configured to drive the slide rail to slide.

2. The sliding mechanism according to claim 1, wherein the driving assembly further comprises a driving assembly bracket fixed to the housing assembly, the driving unit comprises a first guide rod, a transmission lead screw, and a driving member, the first guide rod and the transmission lead screw are assembled to the driving assembly bracket, the driving member is connected to an end of the transmission lead screw, and the driving member is configured to drive the transmission lead screw to rotate; and
   the push member is provided with a transmission hole and a sliding hole, the transmission lead screw is connected in the transmission hole in a transmission manner, and the first guide rod is slidably fitted in the sliding hole.

3. The sliding mechanism according to claim 1, wherein the elastic buffering assembly comprises a first fixed portion, a second fixed portion, a second guide rod, and a first elastic member; and
   the first fixed portion and the second fixed portion are fixed to the slide rail, the second guide rod is fixed between the first fixed portion and the second fixed portion, the first elastic member is fitted over the second guide rod, and the push member is configured to push the first elastic member to stretch and retract on the second guide rod.

4. The sliding mechanism according to claim 3, wherein the elastic buffering assembly further comprises a guide sleeve slidably fitted over the second guide rod and connected to an end of the first elastic member, and the push member is connected to the guide sleeve.

5. The sliding mechanism according to claim 2, wherein the driving unit further comprises a reduction gearbox having an end connected to the transmission lead screw and another end connected to the driving member.

6. The sliding mechanism according to claim 1, wherein the slide rail comprises a first slide rail and a second slide rail configured to slide towards each other and slide away from each other, the driving unit comprises a first driving unit and a second driving unit, the first driving unit is connected to the first slide rail, and the second driving unit is connected to the second slide rail.

7. The sliding mechanism according to claim 1, wherein the slide rail assembly further comprises a buffering limiting member, the buffering limiting member is arranged on the fixed member, and the buffering limiting member is configured to abut against the slide rail sliding from the outside to the housing assembly.

8. The sliding mechanism according to claim 1, wherein the sliding slot comprises a lubricating layer, and the lubricating layer forms an inner wall of the sliding slot.

9. An electronic device, comprising:
   a housing assembly;
   a sliding mechanism, comprising:
      a slide rail assembly having a front surface and a rear surface, and comprising a fixed member and a slide rail, the fixed member being fixed to a housing assembly of the electronic device, the fixed member being provided with a sliding slot, and an end of the slide rail being slidably limited in the sliding slot; and
      a driving assembly fixed to the housing assembly, the driving assembly comprising a driving unit connected to the slide rail in a one-to-one correspondence, and the driving unit being configured to drive the slide rail to slide from the housing assembly to the outside and to slide from the outside to the housing assembly; and
   a flexible screen, a part of the flexible screen being arranged on the front surface of the slide rail and fixed to the housing assembly, an end of the flexible screen being arranged to an edge or the rear surface of the slide rail, the slide rail being configured to slide from the housing assembly to the outside to allow the flexible screen to stretch, and the slide rail being further configured to slide from the outside to the housing assembly to allow the flexible screen to retract,
   wherein the driving unit further comprises an elastic buffering assembly, the elastic buffering assembly is fixed to the slide rail, and configured to drive the slide rail to slide,
   wherein the driving assembly further comprises a push member, the elastic buffering assembly is connected to the push member and the push member is configured to drive the slide rail to slide.

10. The electronic device according to claim 9, wherein the electronic device further comprises a controller, the controller is connected to the driving unit of the sliding mechanism, and the controller is configured to control the driving unit to drive the slide rail to slide.

11. The electronic device according to claim 9, wherein an edge of the housing assembly is provided with a limiting portion, the slide rail is provided with a limiting slot, and the limiting portion is limited in the limiting slot when the slide rail slides from the housing assembly to the outside.

12. The electronic device according to claim 11, wherein the limiting portion is configured as one of a bump structure, or a screw fixed to the housing assembly.

13. The electronic device according to claim 9, further comprising an elastic stretch and retraction assembly arranged on the rear surface of the slide rail assembly and assembled to the housing assembly, an end of the flexible screen being connected to the elastic stretch and retraction assembly, and the elastic stretch and retraction assembly being forced to stretch and retract by the end of the flexible screen.

14. The electronic device according to claim 13, wherein the elastic stretch and retraction mechanism comprises:
 a fixed bracket fixed to the housing assembly;
 a guide member connected to the fixed bracket;
 a sliding member slidably connected to the guide member, and configured to connect with the end of the flexible screen; and
 a second elastic member arranged between the fixed bracket and the sliding member, and configured to reset the sliding member.

15. The electronic device according to claim 9, further comprising a reel assembly fixed to the edge of the slide rail configured to slide from the housing assembly to the outside, another part of the flexible screen being wound around the reel assembly from the end of the flexible screen in a stretchable and retractable manner, the slide rail being configured to slide from the housing assembly to the outside to allow the other part of the flexible screen to stretch from the reel assembly, and the slide rail being further configured to slide from the outside to the housing assembly to allow the other part of the flexible screen to retract to the reel assembly.

16. The electronic device according to claim 15, wherein the reel assembly comprises:
 a reel bracket fixed to the edge of the slide rail;
 a rotating shaft rotatably assembled to the reel bracket; and
 a third elastic member connected to the rotating shaft, and configured to reset the rotating shaft.

17. The electronic device according to claim 16, wherein the other part of the flexible screen is wound around the rotating shaft from the end of the flexible screen.

18. The electronic device according to claim 9, further comprising a support plate assembly arranged between the slide rail assembly and the flexible screen,
 wherein the support plate assembly comprises a fixed support plate and a movable support plate, the fixed support plate is fixed to the housing assembly, the movable support plate is slidably connected to the fixed support plate, the movable support plate is further connected to the slide rail, and the part of the flexible screen is fixed to the fixed support plate.

19. The electronic device according to claim 18, wherein an edge of the fixed support plate is provided with a plurality of first convex portions and a plurality of first concave portions, an edge of the movable support plate is provided with a plurality of second convex portions and a plurality of second concave portions, the plurality of second convex portions are slidably connected to the plurality of first concave portions, and the plurality of second concave portions are slidably connected to the plurality of first convex portions.

* * * * *